(12) United States Patent
Gonzalez, Jr. et al.

(10) Patent No.: US 11,526,854 B2
(45) Date of Patent: Dec. 13, 2022

(54) SYSTEMS AND METHODS FOR AUGMENTED REALITY AND FOR TRANSFERRING SESSIONS BETWEEN DEVICES

(71) Applicant: Epicor Software Corporation, Austin, TX (US)

(72) Inventors: Ernesto Gonzalez, Jr., Katy, TX (US); Jeffrey Scott Tompkins, Liberty Hill, TX (US); Stephen J. Gannon, Austin, TX (US); Sergio Hernandez Palomares, Monterrey (MX); Alan Saldivar, Apodaca (MX)

(73) Assignee: EPICOR SOFTWARE CORPORATION, Austin, TX (US)

(*) Notice: Subject to any disclaimer, the term of this patent is extended or adjusted under 35 U.S.C. 154(b) by 0 days.

(21) Appl. No.: 16/585,487

(22) Filed: Sep. 27, 2019

(65) Prior Publication Data

US 2020/0143333 A1    May 7, 2020

Related U.S. Application Data

(60) Provisional application No. 62/738,104, filed on Sep. 28, 2018, provisional application No. 62/738,109, filed on Sep. 28, 2018.

(51) Int. Cl.
   *G06Q 10/00* (2012.01)
   *H04L 67/131* (2022.01)
   (Continued)

(52) U.S. Cl.
   CPC .......... *G06Q 10/20* (2013.01); *G06F 16/9554* (2019.01); *G06F 21/44* (2013.01); *G06T 19/006* (2013.01); *H04L 67/131* (2022.05)

(58) Field of Classification Search
   CPC ..... G06Q 10/20; G06F 16/9554; G06F 21/44; G06T 19/006; H04L 67/38
   See application file for complete search history.

(56) References Cited

U.S. PATENT DOCUMENTS 8,738,699 B2    5/2014 Hovdal et al.
10,049,111 B2    8/2018 Soldani
(Continued)

FOREIGN PATENT DOCUMENTS

KR    10-2012-0015802    2/2012

OTHER PUBLICATIONS

Official Action for Canadian Patent Application No. 3057108, dated Nov. 26, 2020, 5 pages.
(Continued)

*Primary Examiner* — Jason D Recek
(74) *Attorney, Agent, or Firm* — Sheridan Ross P.C.

(57) ABSTRACT

A method includes establishing a session between a first client device and a host device to run an application on the first client device. The method includes receiving an indication to transfer the session from the first client device to a second client device. The method includes storing, in response to receiving the indication, state information of the application for the session. The method includes generating a pointer associated with the session. The method includes generating a scannable code including the pointer. The method includes scanning the displayed scannable code using an imaging element associated with the second client device. The method includes transferring, using the pointer, the session from the first client device to the second client device using the stored state information so that a second display associated with the second client device displays a most recently updated instance of the application from the first client device.

20 Claims, 24 Drawing Sheets

(51) Int. Cl.
  *G06F 16/955*  (2019.01)
  *G06F 21/44*  (2013.01)
  *G06T 19/00*  (2011.01)

(56) References Cited

U.S. PATENT DOCUMENTS

| | | |
|---|---|---|
| 10,055,895 B2 | 8/2018 | Li et al. |
| 10,061,131 B2 | 8/2018 | Dukerschein et al. |
| 10,063,836 B2 | 8/2018 | Popham |
| 10,074,381 B1 | 9/2018 | Cowburn et al. |
| 10,075,552 B2 | 9/2018 | Demsey |
| 2007/0094490 A1* | 4/2007 | Lohr ............... H04L 67/14 713/153 |
| 2010/0217554 A1* | 8/2010 | Knight ............ G06Q 10/20 702/84 |
| 2012/0123951 A1* | 5/2012 | Hyatt ............. G06Q 10/10 705/305 |
| 2013/0005487 A1* | 1/2013 | Frazzini ........ H04L 67/142 463/43 |
| 2013/0212286 A1* | 8/2013 | Krishnakumar .. H04L 29/06319 709/227 |
| 2014/0146038 A1* | 5/2014 | Kangas .......... G06T 19/006 345/419 |
| 2015/0008258 A1* | 1/2015 | Ernst ............ G06K 19/0723 235/375 |
| 2017/0091998 A1* | 3/2017 | Piccolo, III ........ G08B 17/10 |
| 2018/0144384 A1* | 5/2018 | Lalonde ........... G06Q 30/04 |
| 2019/0251747 A1* | 8/2019 | Yin ............... G06T 19/006 |

OTHER PUBLICATIONS

Official Action for Canadian Patent Application No. 3057108, dated Nov. 8, 2021, 4 pages.

* cited by examiner

SYSTEMS AND METHODS FOR AUGMENTED REALITY AND FOR TRANSFERRING SESSIONS BETWEEN DEVICES

CROSS REFERENCE TO RELATED APPLICATIONS

This application claims priority to U.S. Provisional applications 62/738,104, filed on Sep. 28, 2018, and 62/738,109, filed on Sep. 28, 2018, the entire disclosures of each of which are hereby incorporated by reference.

FIELD

Example embodiments relate to augmented reality systems and methods that are particularly adapted to the inspection, identification and procurement of parts, and repair of vehicles. Example embodiments also relate to systems and methods for transferring sessions between devices, for example, in preparation for vehicle inspection/repair.

BACKGROUND

The maintenance of complex systems, such as vehicles, is typically performed by highly skilled technicians. Due to the wide variety of vehicles, and to differing experience and skill levels of individual technicians, it is desirable to provide technicians with pertinent information regarding tasks to be completed related to a particular vehicle. In the past, such information has been provided in the form of written documentation. More recently, such information has been at least partially automated, and presented through interactive electronic guides. Moreover, such guides can provide information through animations or video, instead of or in addition to static text and drawings.

Systems have also been developed to provide information regarding replacement parts to technicians and consumers. However, catalogs or other systems providing information regarding replacement parts have required the user to identify the part by name or part number. In addition, a user is typically required switch between different systems in order to access repair and replacement part information.

More recently still, augmented reality systems have been proposed for assisting in various tasks. Augmented reality systems typically aspire to provide a user with computer generated or supplied information that is pertinent to real world objects, and that is presented as an overlay to a view of the real-world objects.

Scannable codes (e.g., one dimensional bar codes, two dimensional quick response (QR) codes, etc.) have been used to track items in fields related to the sale and transportation of goods. With the development of mobile devices including cameras, such as smart phones, scannable codes have also been used for providing a user of the mobile device with information linked to the scannable code over a communications network.

SUMMARY

In accordance with at least one example embodiment, an augmented reality system for facilitating the inspection and repair of vehicles is provided. More particularly, systems and methods are provided that receive information identifying a vehicle, identify a vehicle assembly from an image, allow a technician to select services or operations to be performed in connection with the identified assembly, provide information pertinent to the selected service or operation, and provide information regarding the sourcing of replacement components. The system can include a graphical user interface that presents icons or identifiers overlaid on an image of a scene. The identifiers can be generated by the system application to specifically identify components included in the image obtained by a camera for which additional information is available. Accordingly, at least one example embodiment provides for an augmented reality system that adds identifiers to an image, enabling a user to select components of interest.

According to at least one example embodiment, systems and methods employ scannable codes to allow for transferring sessions of an application between a first client device and a second client device. Such systems and methods according to example embodiments are useful in fields where an initial session may be started on a normally stationary client device (e.g., a desktop computer), but the session is desired to be continued on a mobile client device (e.g., a smartphone) without losing data and/or navigation already established and/or input during the initial session. One such field includes the automotive service industry where applications that assist mechanics with automobile inspections and other services have functionalities that are desired to be mobile. For example, during a vehicle inspection, it may be desired to have the functionality of an automobile inspection application available at a mobile device without having an instance of the application downloaded on the mobile device. In addition, it is desired that the application session be seamlessly transferred to the mobile device so that the application "picks up" on the mobile device where it left off on the stationary device just prior to transferring the session. Further still, example embodiments provide that the application mirrors itself on the stationary device and the mobile device so that information entered on one device is mirrored on the other device with little to no delay.

Additional features and advantages of example embodiments will become more readily apparent from the following description, particularly when taken together with the company drawings.

BRIEF DESCRIPTION OF THE DRAWINGS

FIGS. 3-19 are screenshots depicting aspects of a user interface and the operation of a system in accordance with at least one example embodiment;

DETAILED DESCRIPTION

Figure 1:
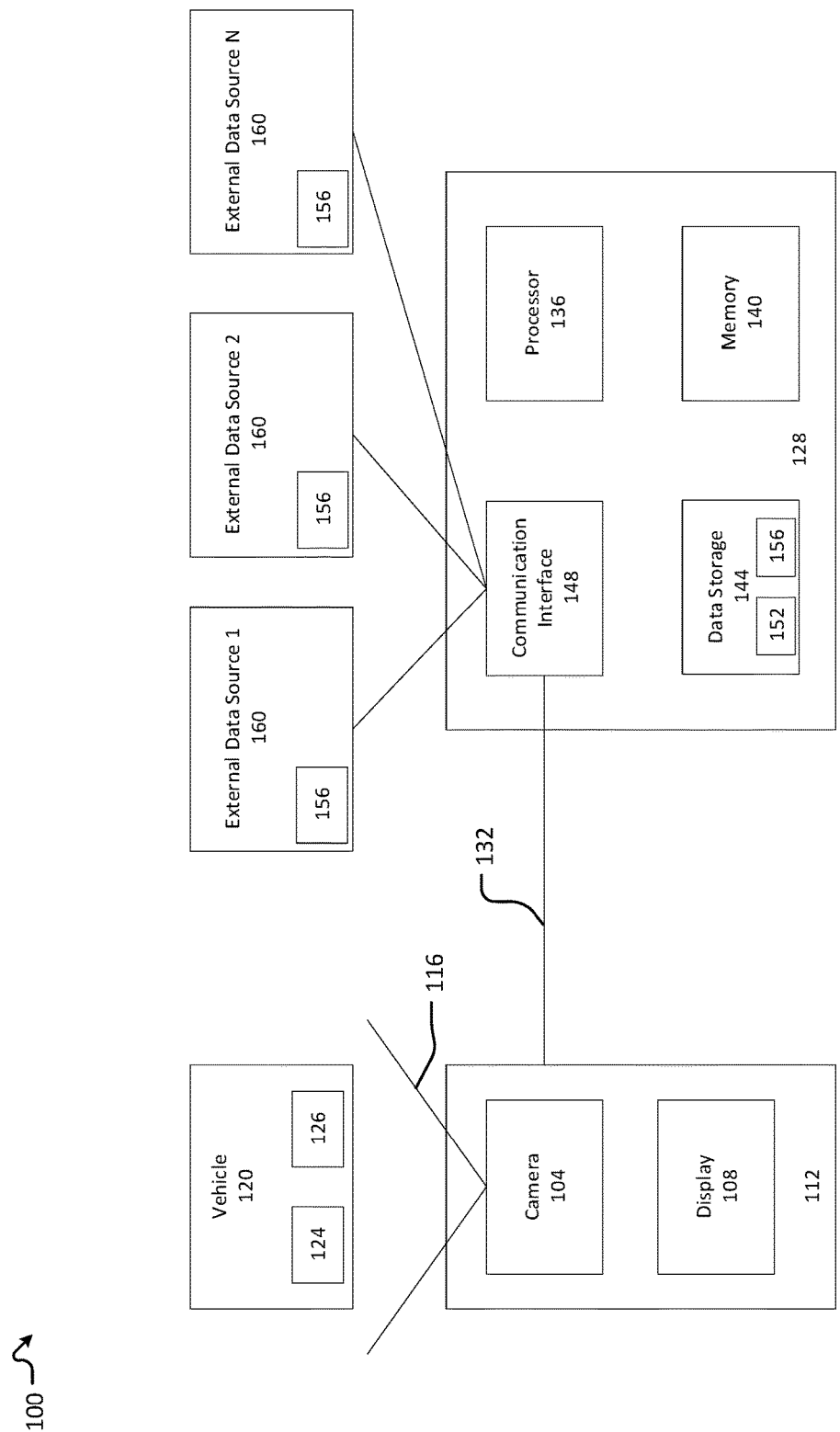
FIG. 1 is a block diagram depicting components of a system in accordance with at least one example embodiment.

FIG. 1 is a block diagram depicting components of an augmented reality system 100 in accordance with at least one example embodiment. The system 100 generally includes a camera 104 and a display or touch screen display 108. In the following discussion, the camera 104 and the display 108 are described as being part of a user device 112, such as but not limited to a smart phone, tablet, or other mobile device. However, it should be appreciated that the camera 104 and display 108 can be provided as separate devices in communication with one another directly or through other components of the system 100. The camera 104 can have a field of view 116. As discussed in greater detail elsewhere herein, in operation a technician or other user positions the camera 104 such that the field of view 116 encompasses a vehicle 120, an assembly 124, or an individual component 126 of the vehicle 120.

The vehicle 120 may comprise a car, truck, or other vehicle or system encompassed by the virtual reality system 100. The various assemblies 124 may be grouped or ordered according to their function, location within the vehicle 120, maintenance interval, or the like. The vehicle 120 is generally associated with an identifier or set of identifiers. For example, the vehicle 120 may be associated with a manufacturer, a model, submodel, and optional items of equipment. As a further example, the vehicle may be associated with a license number or vehicle identification number. In accordance with at least one example embodiment, and as discussed in greater detail elsewhere herein, one or more vehicle 120 identifiers are applied to facilitate the identification of one or more subassemblies 124 or parts 126 within an image provided by the camera 104, and the provision of maintenance, repair, and other pertinent information.

The system 100 further includes a primary or server computer 128. As an example, but without limitation, the server computer 128 may comprise a Web server in communication with the user device 112 via a wide area network 132, such as the Internet. As can be appreciated by one of skill in the art after consideration of example embodiments, the wide area network 132 can include multiple nodes, such as a local computer, a wireless access point, or other components or devices, provided as part of or as an adjunct to the system 100 to which the user device 112 communicates over a local area network connection. Moreover, various network links can be provided as wireline or wireless connections. For instance, in an exemplary implementation, the user device 112 can be connected to a local base station or computer via a Wi-Fi link. As yet another alternative, the server computer 128 may be local to the user device 112.

The server computer 128 can include various components. For example, the server 128 a can include a processor 136, memory 140, data storage 144, and a communication interface 148. The processor 136 can include a general purpose programmable processor capable of executing instructions or program code in association with the memory 140. The memory 140 can include RAM, DRAM, SDRAM, or any other type of memory suitable for the short or long-term storage of instructions, data, data products, or the like. The data storage 144 generally operates to provide long-term storage of application instructions, software, data, or data products. For example, the data storage 144 can contain an augmented reality application 152, and assembly, parts catalog, or other data 156. In accordance with at least one example embodiment, the memory 140 and data storage 144 may comprise the same physical memory device or set of memory devices. The communication interface 148 can provide for interconnections between the server computer 128 and the user device 112. In accordance with still other embodiments, the communication interface 148 can provide for interconnections between the server computer 128 and one or more external data sources 160.

If included in the system 100, the one or more data sources 160 can comprise databases or other sources or stores of information relevant to the operation of the system 100, and in particular the operation of the augmented reality application 152. Accordingly, such information can include assembly, parts, catalog, or other data 156. Moreover, such data 156 can be stored in one or more external data sources 160, in place of or in addition to data stored in the data storage 144 of the server computer 128. In accordance with at least one example embodiment, the data 156 is stored as separate sets of data, such as data pertaining to subassemblies of a particular vehicle 120, particular subassemblies, particular parts suppliers, or the like.

In operation, and as discussed in greater detail elsewhere herein, execution of the augmented reality application 152 can include receiving an image of a scene taken by the camera 104 that includes an assembly or set of components of a vehicle 120, identifying the components, and generating augmented reality indicia, such as icons or indicators that are superimposed on identified components in the image as displayed by the display 108. The execution of the augmented reality application 152 can additionally include receiving a selection of a particular component and a selection of an action related to that component in the form of user input, including a user selection of an icon displayed by the display 108 that is associated with a component, and presenting information related to the selected component and action. The image of the scene and the augmented reality information can be presented as a graphical user interface that allows a user to make selections or otherwise provide input to the system 100.

Figure 2:
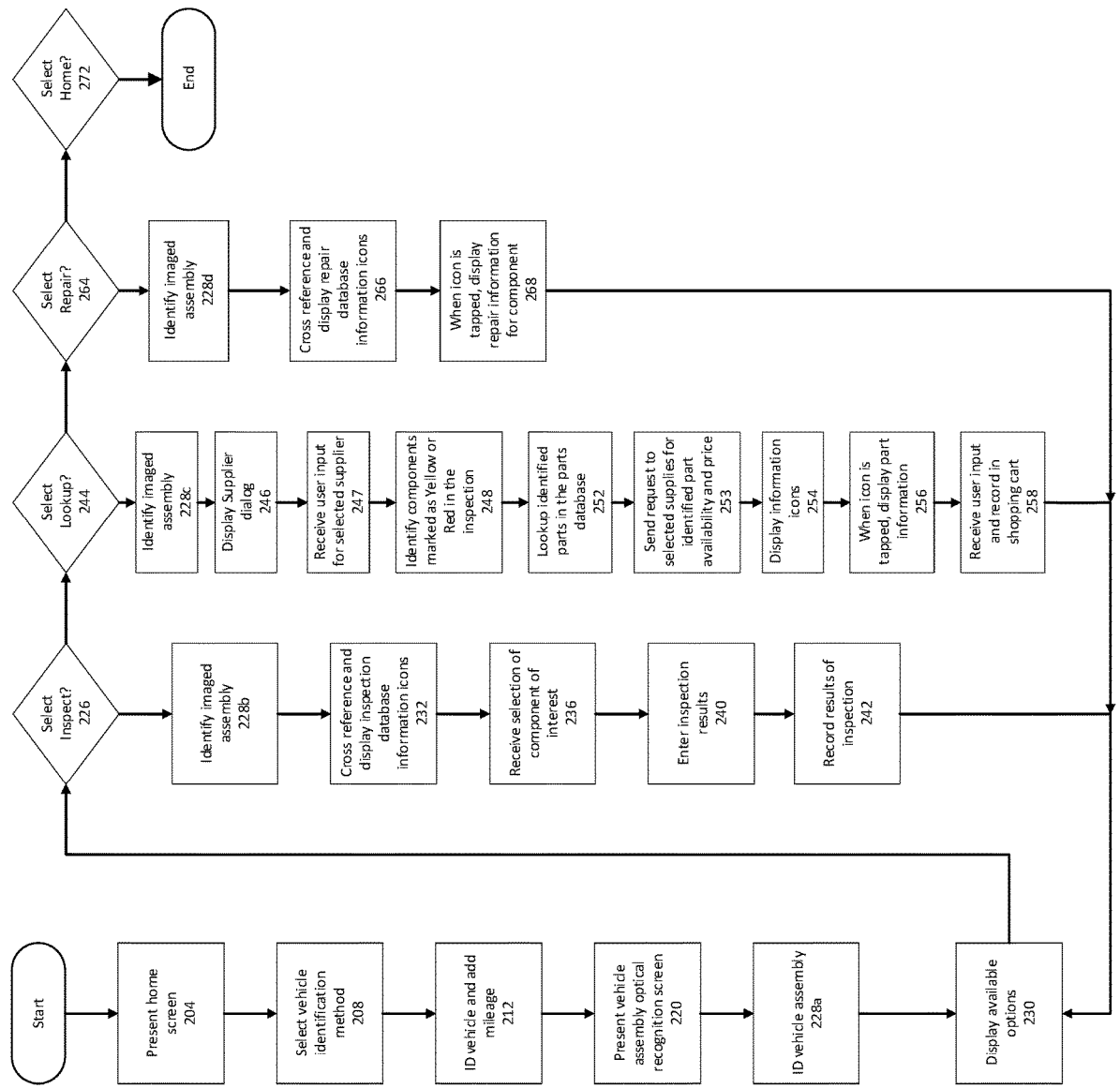
FIG. 2 is a flowchart depicting aspects of an augmented reality process in accordance with at least one example embodiment.

With reference now to FIG. 2, aspects of the operation of an augmented reality system 100 in accordance at least one example embodiment are illustrated. In general, steps performed by components of the system 100 can be made in connection with the execution of the augmented reality application 152 stored in data storage 144 and executed by the processor 136. In general, the steps of the method can include operations in which the user device 112 operates as a user interface in cooperation with the server computer 128 to present an augmented view of a scene, to provide information regarding components within the scene, and to receive input from a user.

Figure 3:
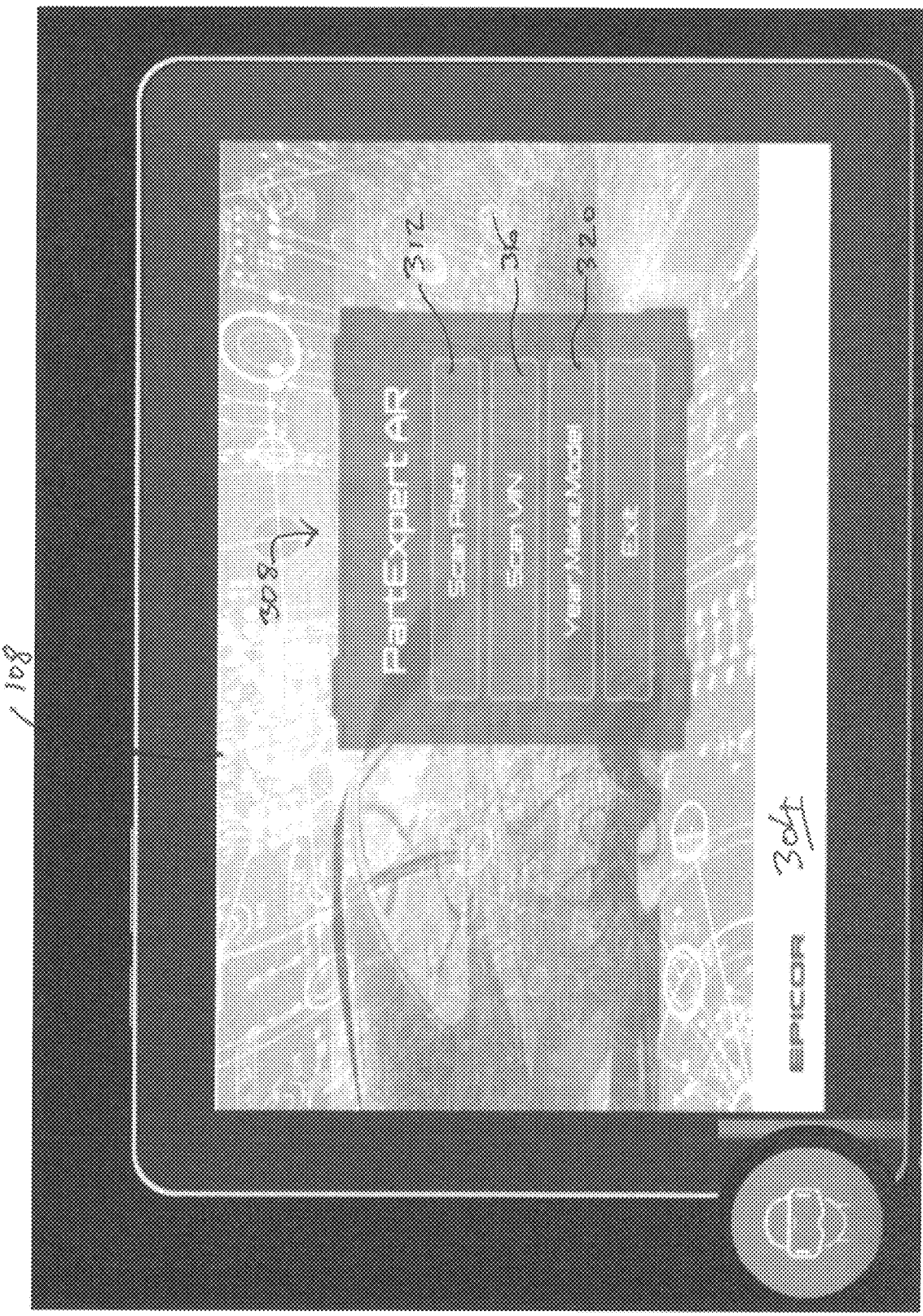
Figure 4:
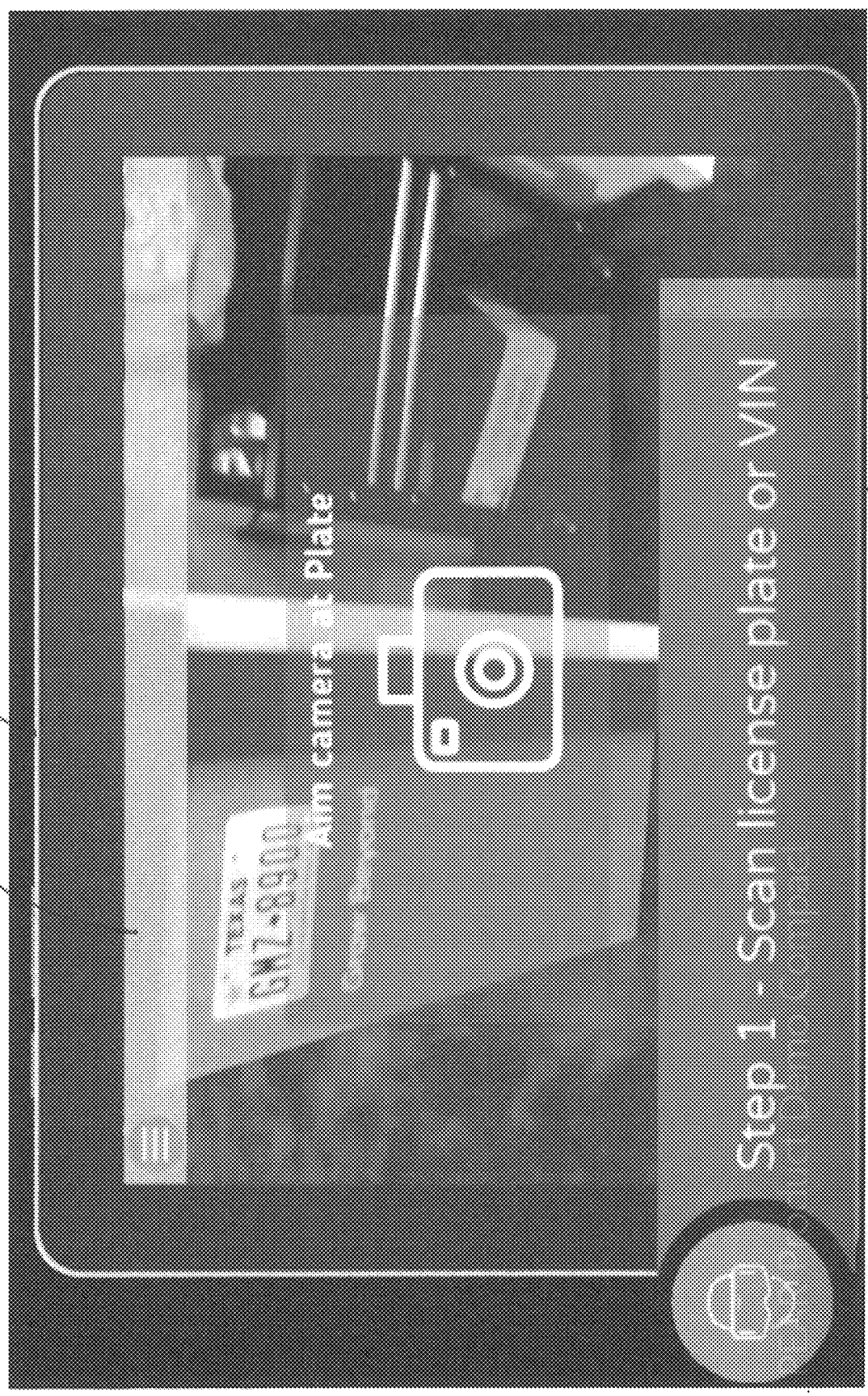
Figure 5:
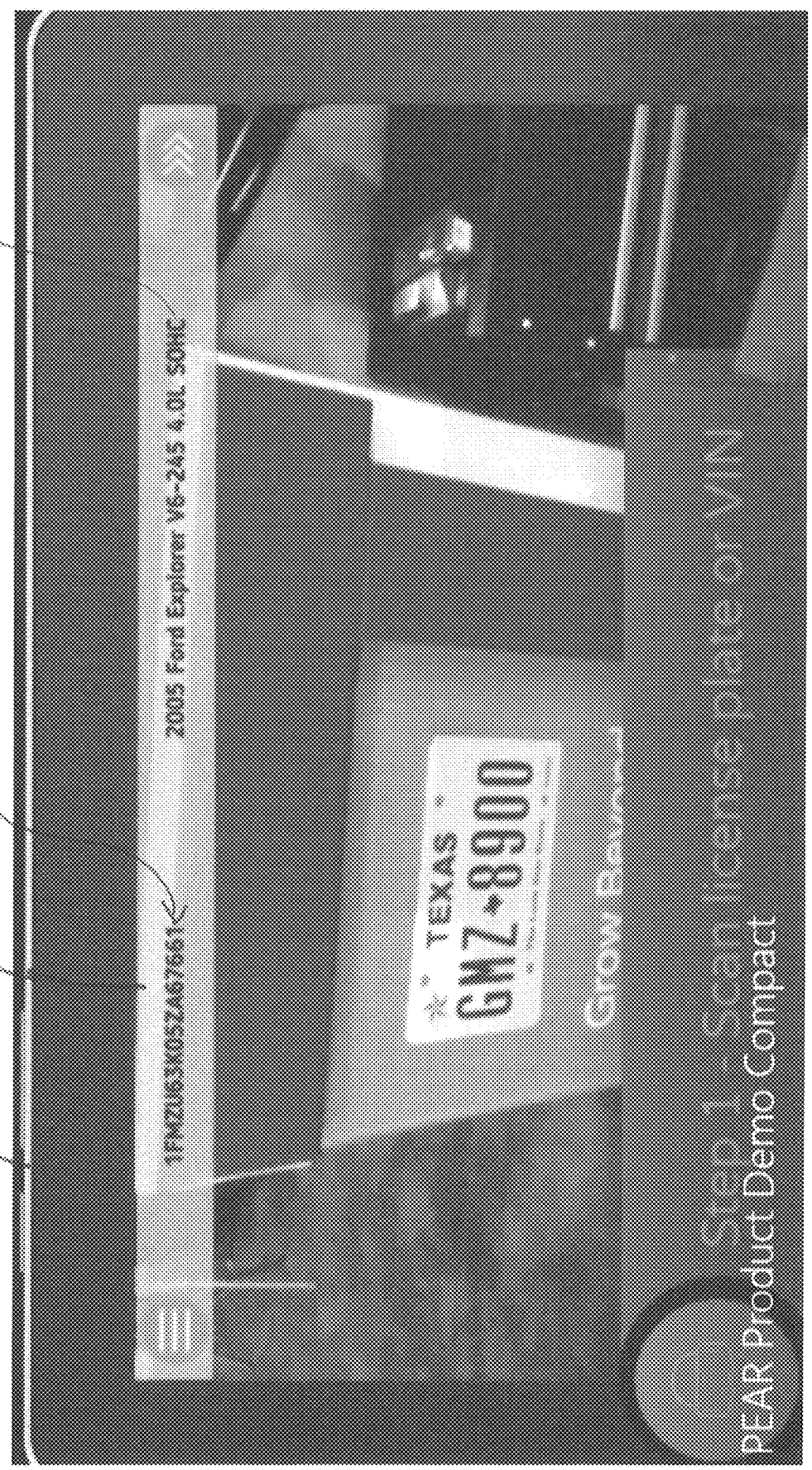
Figure 6:
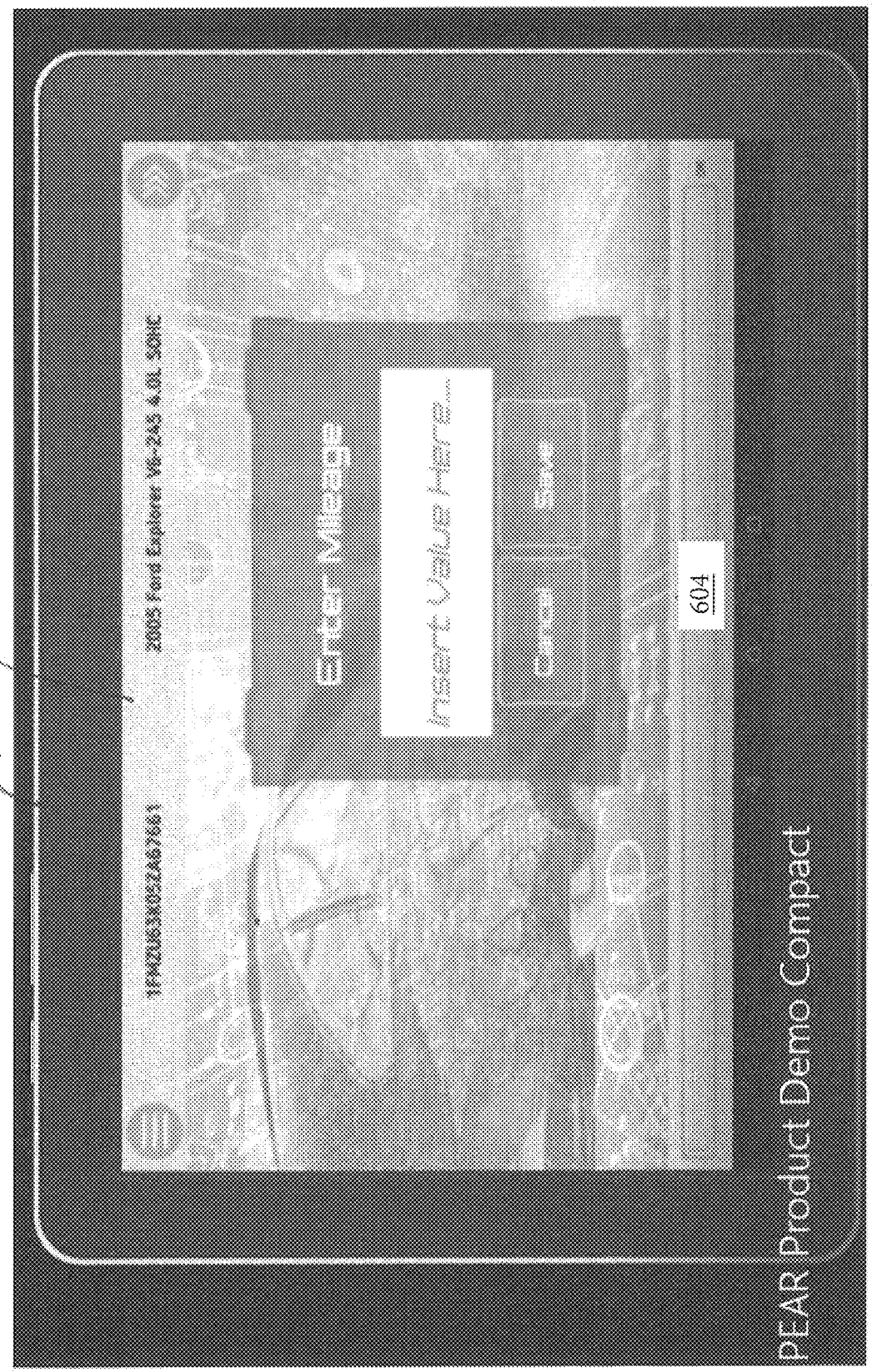
Figure 7:
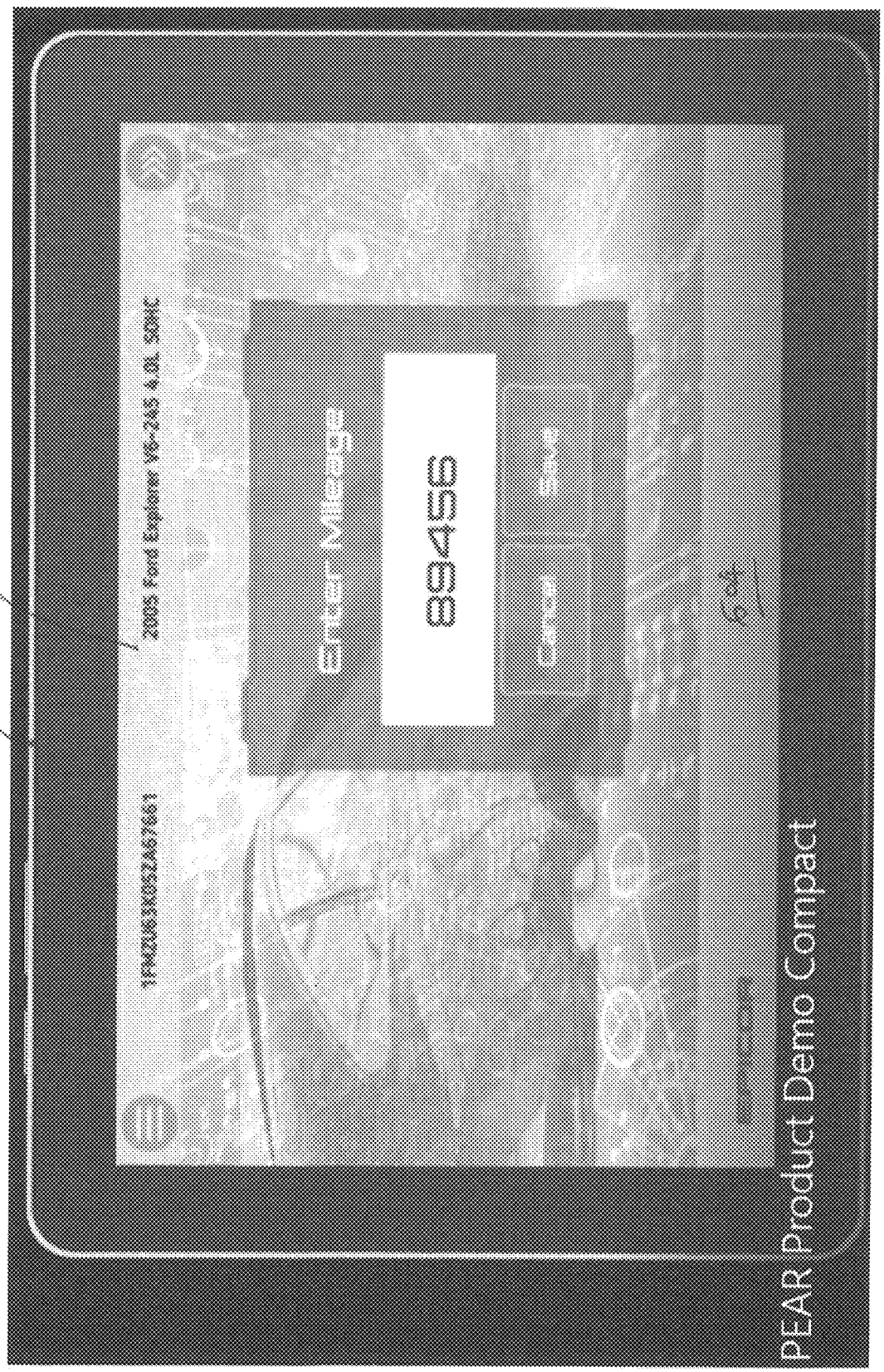

Initially, at step 204, the display 108 of the user device 112 presents a home screen 304 (see FIG. 3) from which the user can select a vehicle 120 identification methodology 308 (step 208). Using information input as an image obtained by the camera 108, or through manual input, the system 100 identifies the vehicle, and can access additional identifying information (step 212). For example, as a vehicle identification methodology 308, the user can choose to scan the vehicle 120 license plate 312, scan the vehicle 120 vehicle identification number 316, or manually enter the year, make, model, or other information 320 identifying the vehicle 120. If the user chooses to identify the vehicle 120 by scanning the vehicle 120 license plate 312, the user is presented with a license plate scan screen 404 (see FIG. 4) that directs the user to aim the field of view 116 of the camera 104 at the license plate. The image containing the license plate, which can be a still or live video image, can then be transmitted to the server computer 128, where text recognition can be used to determine the state of registration and the alphanumeric license plate code, which in turn can be used to look up the vehicle 120 identifying information. As an example, the license plate code can be used to access an external data source 160 in the form of a database of registered vehicles for the state of registration. In accordance with at least one example embodiment, the license plate number is sent to an external data source, for example maintained by a third party, that returns the vehicle's VIN. From the VIN, identifying information, such as the vehicle year, make, model, engine, and optional equipment 504, can be decoded using a VIN decoding process. The identifying information, together with the VIN number 508, can then be displayed, as illustrated in FIG. 5. As another example, in response to a selection of the "scan VIN" 316 entry method, the user is presented with a scan screen that directs the user to aim the field of view 116 of the camera 104 at a copy of the vehicle identification number bar code for the vehicle 120. Decoding the bar code to text can then be used to determine the VIN, which can in turn be used to access a database of the numbers, for example included as part of a local database stored in data storage 144, or as part of an external data source 160. If a selection to enter the year, make, and model 320 of the vehicle 120 is made, the user may be presented with an input screen, to receive that information. The user may then be presented with the option of entering additional information regarding the vehicle, such as the vehicle mileage, by a mileage entry page 604, as illustrated in FIGS. 6 and 7. As can be appreciated by one of skill in the art after consideration of at least one example embodiment, entries of information and selections made by a user can be entered through a touch screen functionality of the display screen 108, a pointing device, or some other input device, for example provided by or associated with a user device 112.

At step 220, the display 112 presents the user with an assembly optical recognition or selection screen 804 (see FIG. 8) that instructs the user to aim the camera 104 at an area or assembly of the vehicle 120 of interest. As depicted in FIG. 8, the instruction to aim the camera 104 at the vehicle component or mechanical system 120 can be presented as an overlay 808 on an image 812 obtained by the camera 104. In accordance with at least one example embodiment, the image obtained by the camera 104 can be a live view or a still image. The system 100 can then operate to identify the vehicle assembly included in the image (step 228a). In accordance with at least one example embodiment, identification of the assembly can include analyzing the three-dimensional live view of the assembly obtained by the camera 104, and applying 3D object recognition to identify the component or assembly and components contained therein. This analysis can be performed by the server computer 128, and in particular by execution of the application programming 152 by the processor 136. The identified assembly that can then be cross-referenced to one or more databases 156 to obtain and display various information, including specifications for the components of the assembly, repair instructions, parts catalogs, or the like (step 232). More particularly, the database or subset of database information 156 that is accessed can depend on the particular service selected by the user as described in greater detail below.

Figure 9:
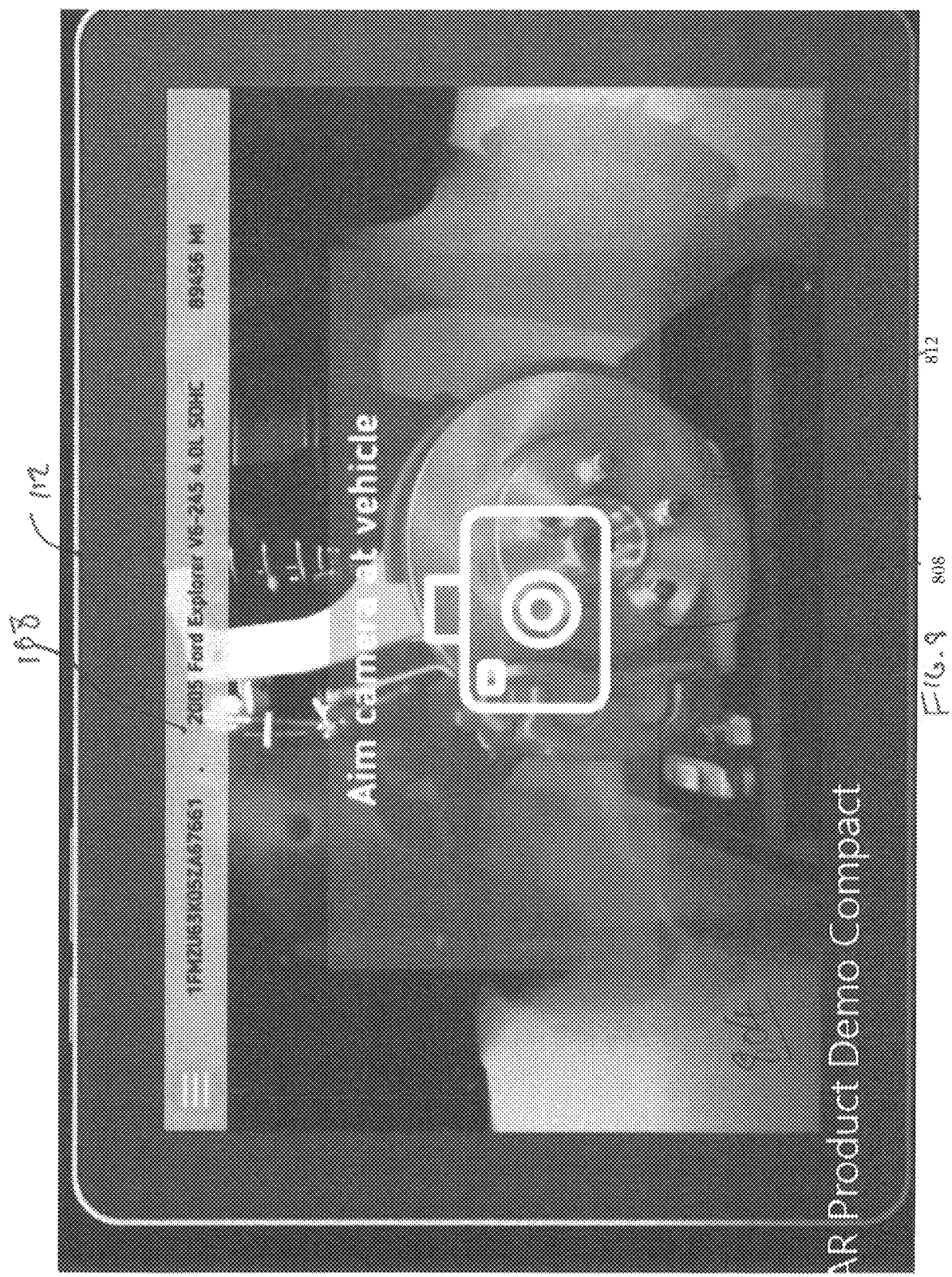

Concurrent with or after the identification of the vehicle assembly, a services selection page 904 can be presented by the user device 112 (step 230). As shown in FIG. 9, the services selection page 904 can include a window 908 in which an image obtained by the camera 104 is displayed. In addition, the service selection page 904 can provide a menu or set of radio buttons 912 from which a particular option, such as inspection 916, parts lookup 920, or repair information 924 can be selected. The user can also choose to return to the home screen by selecting the home button 928.

As shown in the example services selection page 904, the window 908 contains a live view, through the device camera 104 and display 108, of a front wheel assembly of the vehicle 120.

Figure 10:
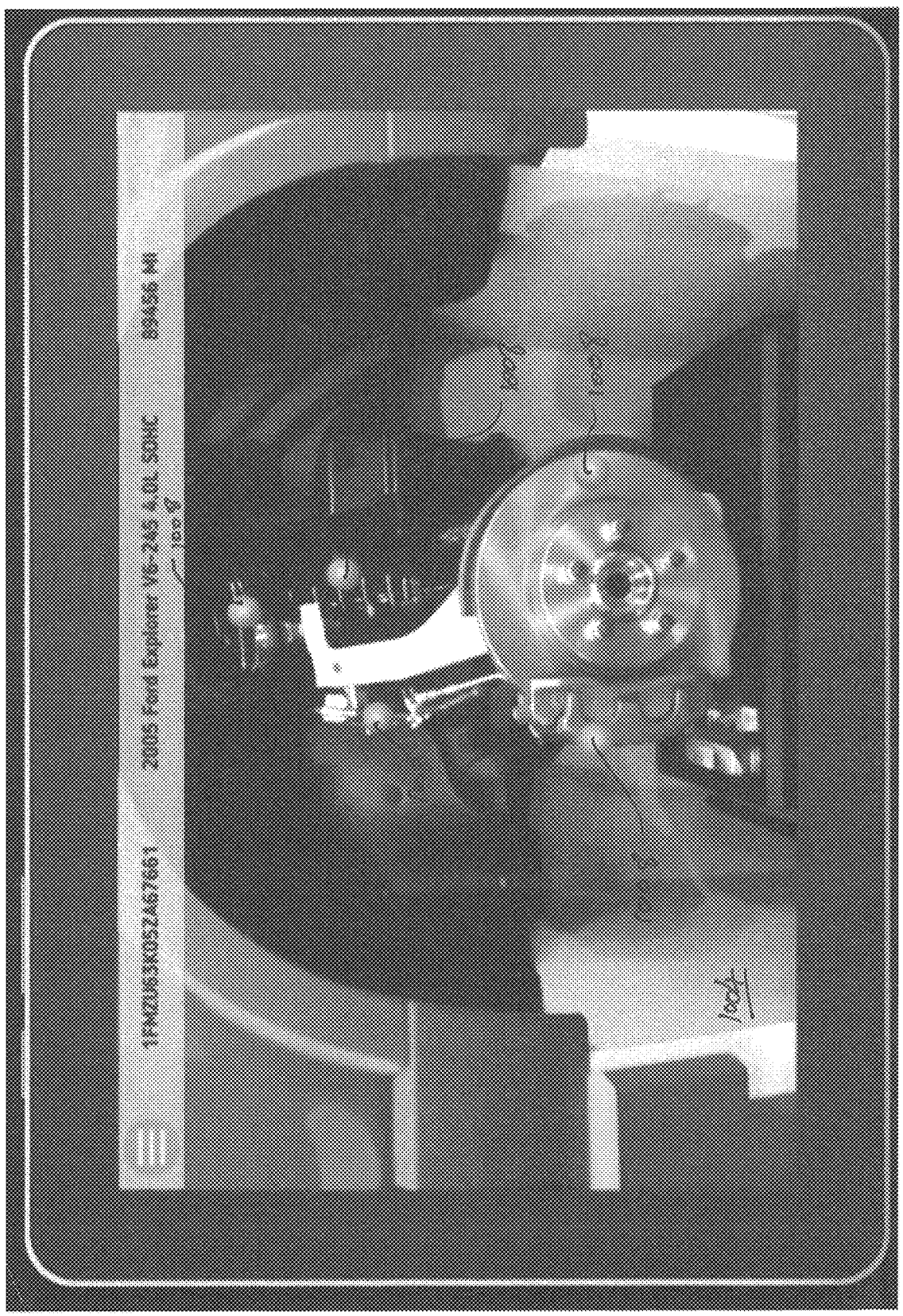

In response to receiving a selection of an "inspection" 916 service by the user (step 226), the system 100 can operate to identify the assembly of the vehicle 120 included in the live view obtained by the camera 104 and displayed in the window 908 (step 228b). In particular, the identification of the assembly within the field of view 116 of the camera 104 can be updated continually or periodically, to identify changes in the assemblies or components within the field of view 116 as a result of a user redirecting the location and field of view 116 of the camera 104. At step 232, an inspection screen 1004 is presented (See FIG. 10). As part of the inspection screen 1004, one or more indicators or icons 1008 are generated and presented over or near components included in the live view of the identified assembly shown in the display 108 that are associated with inspection procedures. Accordingly, the image of the vehicle 120 assembly is augmented by the icons or identifiers 1008 associated with relevant components (e.g. components requiring inspection). As can be appreciated by one of skill in the art after consideration of at least one example embodiment, by augmenting the image with indications of relevant component parts, a user can make selections without knowing the name of the part. In addition, because the image is a live view of a component or assembly, the user can walk or otherwise move around the assembly and as the view changes in the camera the floating icons 1008 will adjust to maintain their position over the identified component or components. Furthermore, by adjusting the position of the camera and thus the components that are visible in the live view, new icons 1008 associated with components that have newly come into view can appear.

Figure 11:
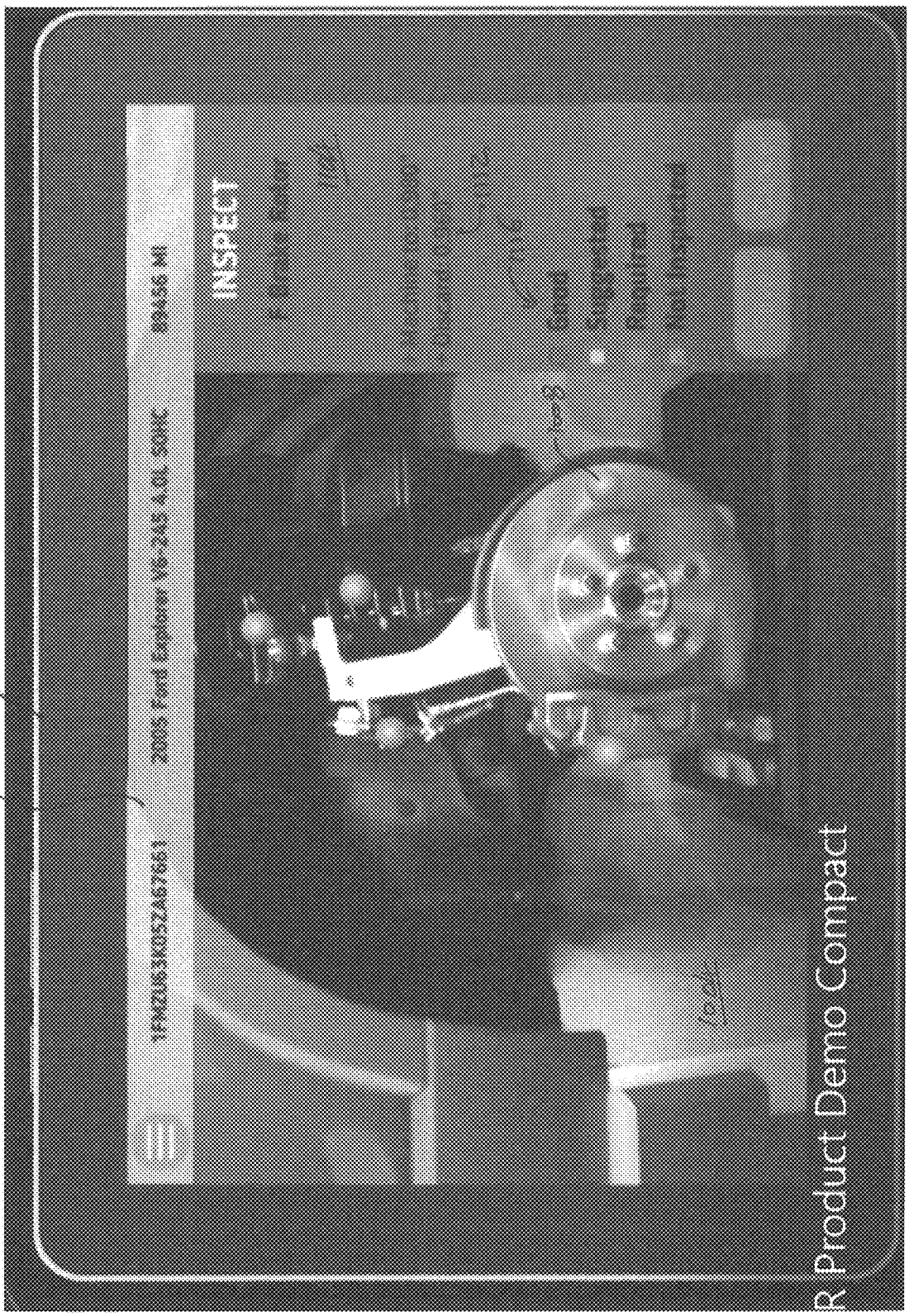

In response to selecting an icon 1008 associated with a component of interest (step 236), an inspection information window or overlay 1104 that includes the name or other identification of the part, and information pertinent to an inspection of the selected component, can be presented in an inspection information portion 1108 of the display 108 (see FIG. 11). In the illustrated example, the user has selected the brake rotor by, for example touching or clicking on the identifier 1008 displayed over the image of the brake rotor, and in response the application programming 152 presents information regarding the minimum thickness of the brake rotor 1112. Accordingly, the inspection information window 1104 can guide a mechanic in inspection procedures related to a selected component (e.g. checking the thickness of the brake rotor) and can present parameters or specifications related to the inspection (e.g. the minimum acceptable thickness of the brake rotor). At step 240, the user can enter the results of the inspection, for example through a touch screen display 108 of the user device 112. For example, the user can enter the results of the inspection by selecting from a set of inspection results buttons 1116. In accordance with at least one example embodiment, the icon or sphere 1008 associated with the selected component can be modified, to indicate the completion of the inspection process, and the results of that process. For instance, after selecting the radio button "good" during the rotor inspection process, the icon 1008 associated with the rotor can change in color from orange to green, to indicate that. Continuing this example, if repair or replacement is indicated by the inspection, and the "suggested" button is selected, and the icon 1008 color can be changed to yellow. If the inspection indicated that replacement is required, the color of the icon 1008 can be changed to red. Icons 1008 associated with components that have not been inspected can be colored orange. The results of the rotor inspection can then be recorded by the system 100 (step 242).

Figure 12:
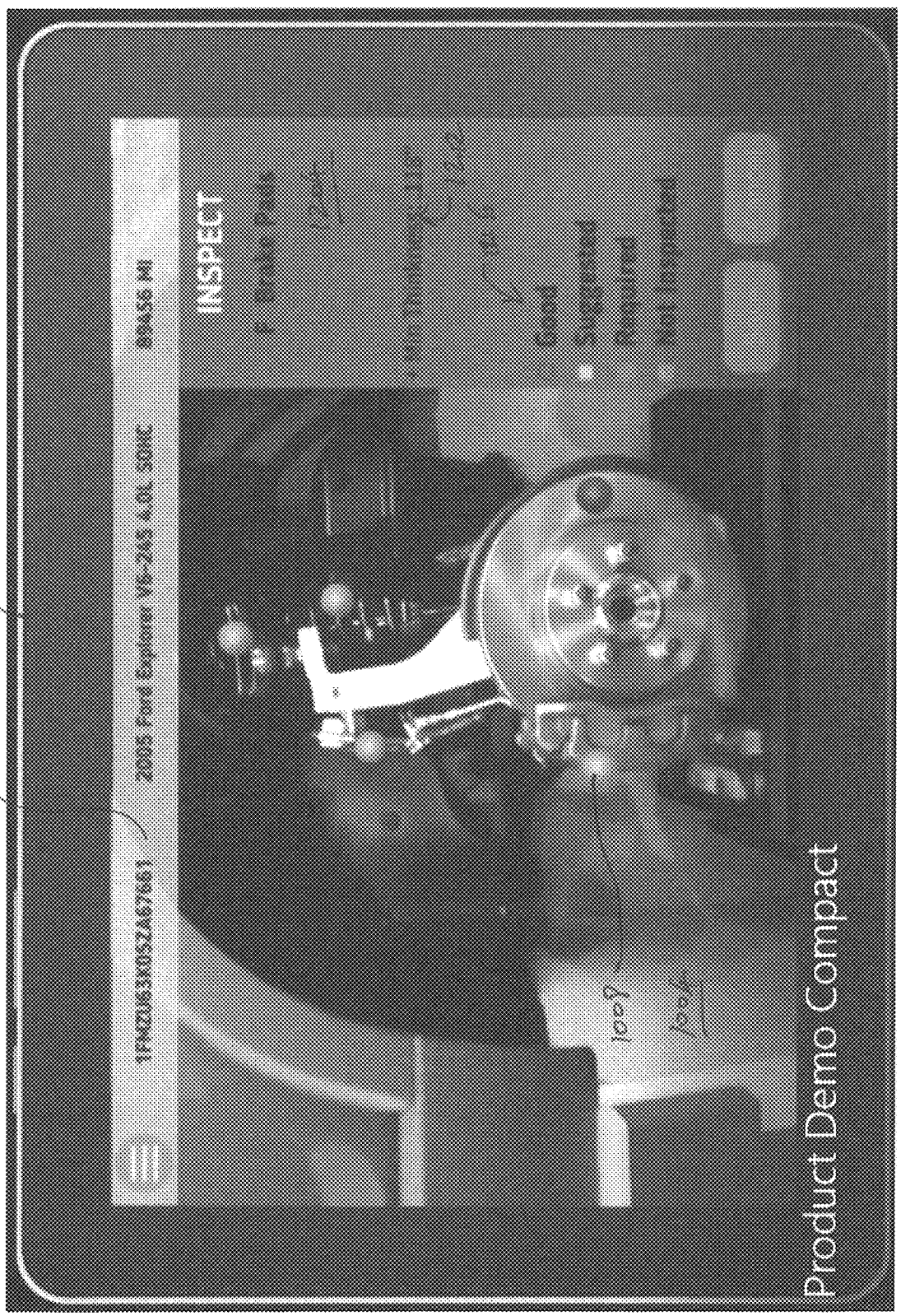

The user can continue to select components for inspection by selecting icons 1008 displayed in the inspection screen 1004. For example, after inspecting the brake rotor, a user may choose to inspect the brake pads. After the selection of the icon 1008 associated with the brake pads, an inspection information window 1204 that include information pertinent to the minimum thickness of the brake pads 1212 can be presented (see FIG. 12). The user can then enter the results of the inspection by selecting from one of the inspection results buttons 1216. For instance, after selecting the radio button "required" during the brake pad inspection process, the icon 1008 associated with the brake pads can change in color from orange to red. The results of the brake pad inspection can then be recorded by the system 100.

Figure 13:
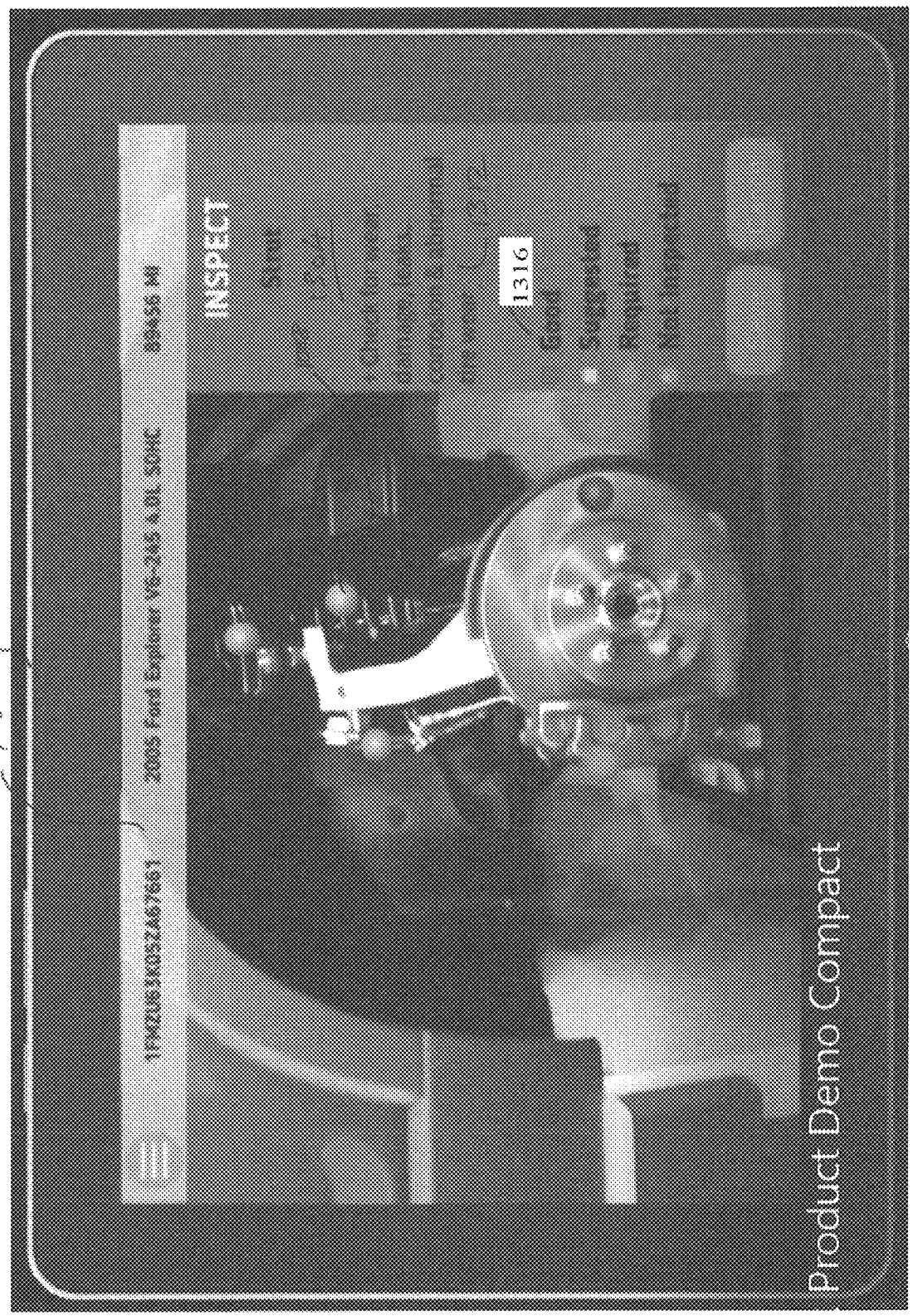

As yet another example, after inspecting the brake pads, the user may choose to inspect the strut. After the selection of the icon 1008 associated with the strut, an inspection information window 1304 that includes information pertinent to the condition of the strut 1312 can be presented (see FIG. 13). The user can then enter the results of the strut inspection of the strut by selecting from one of the inspection results buttons 1316. The results of the strut inspection can then be recorded by the system 100.

Figure 14:
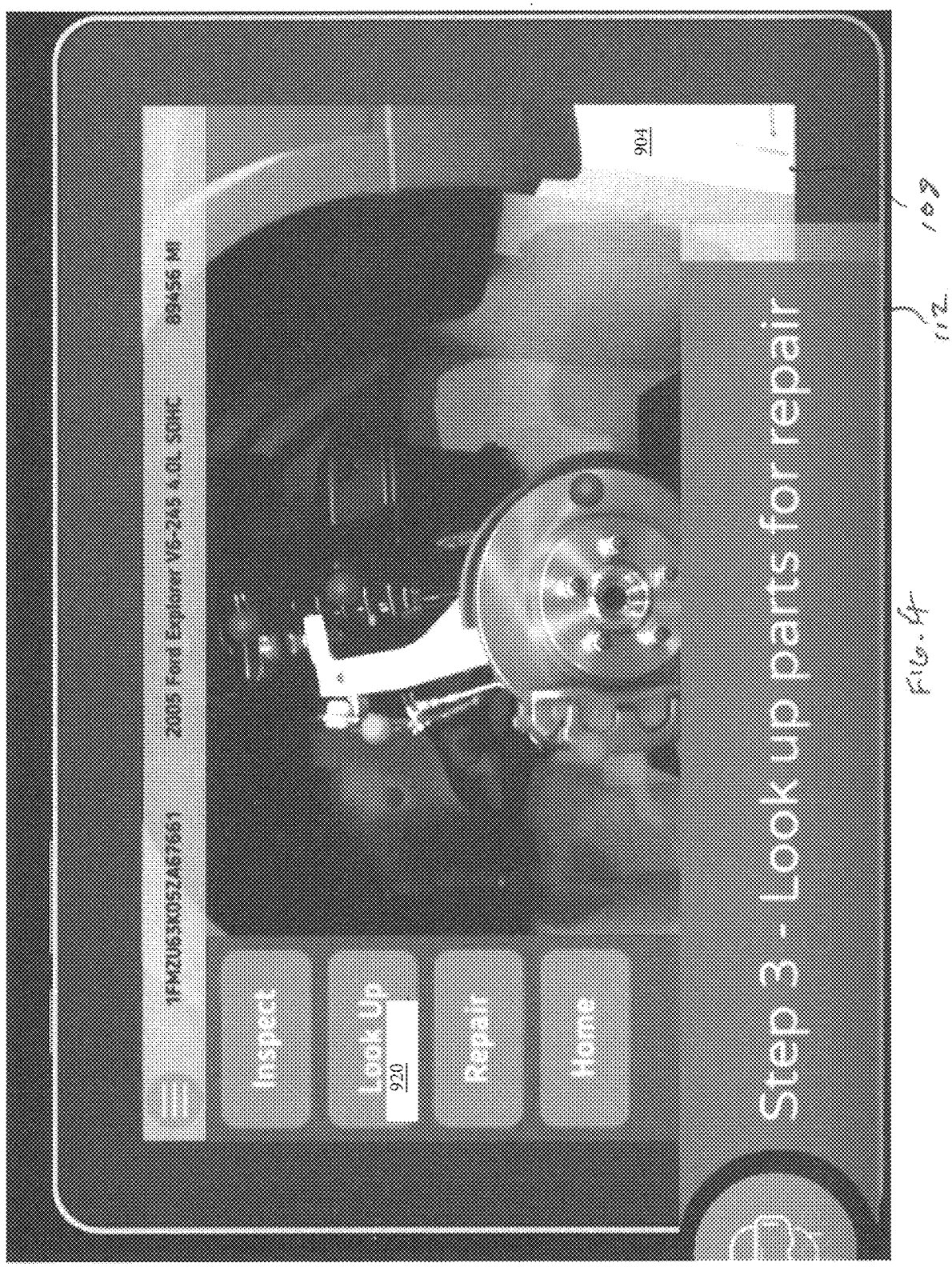
Figure 15:
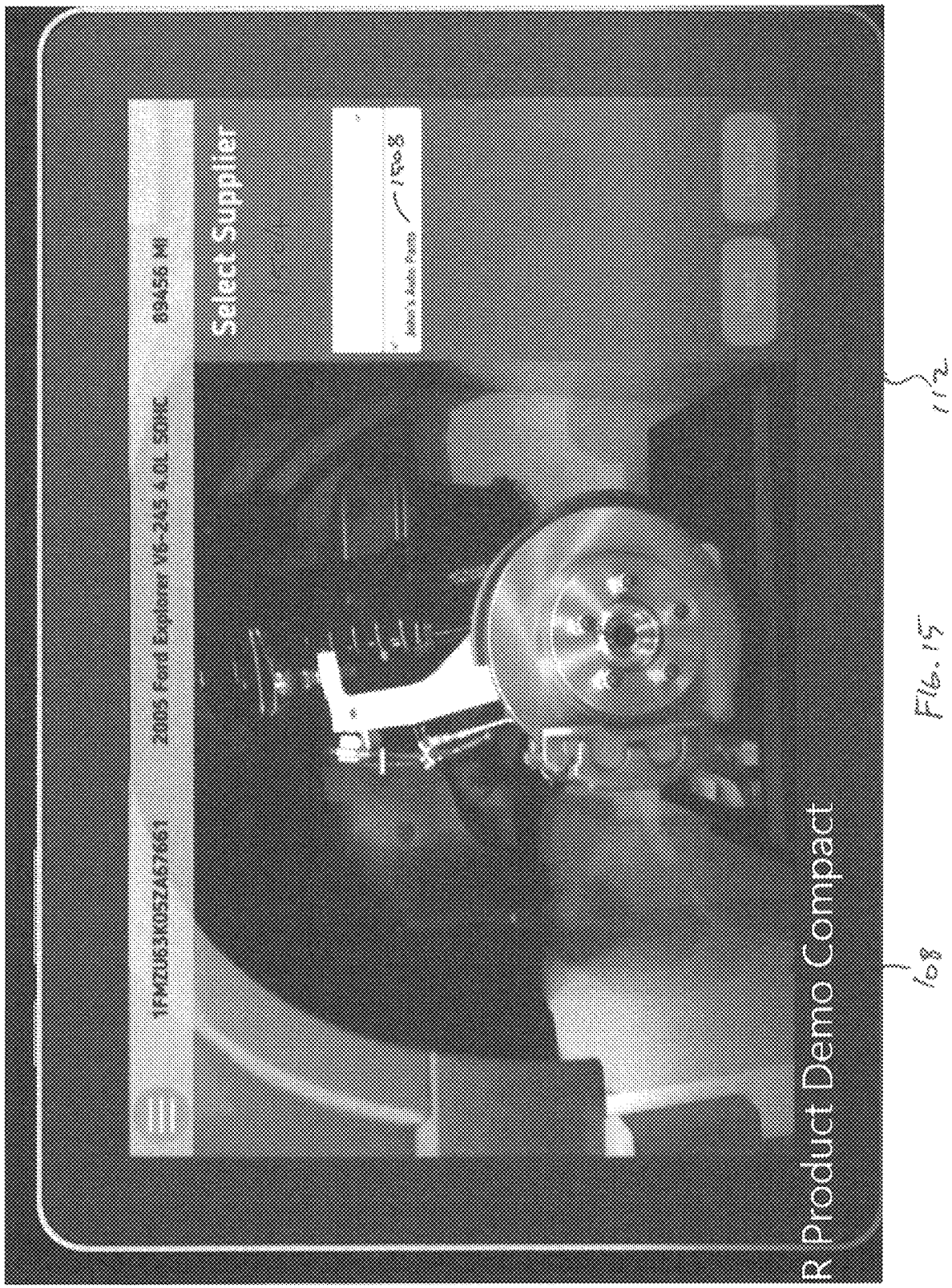
Figure 16:
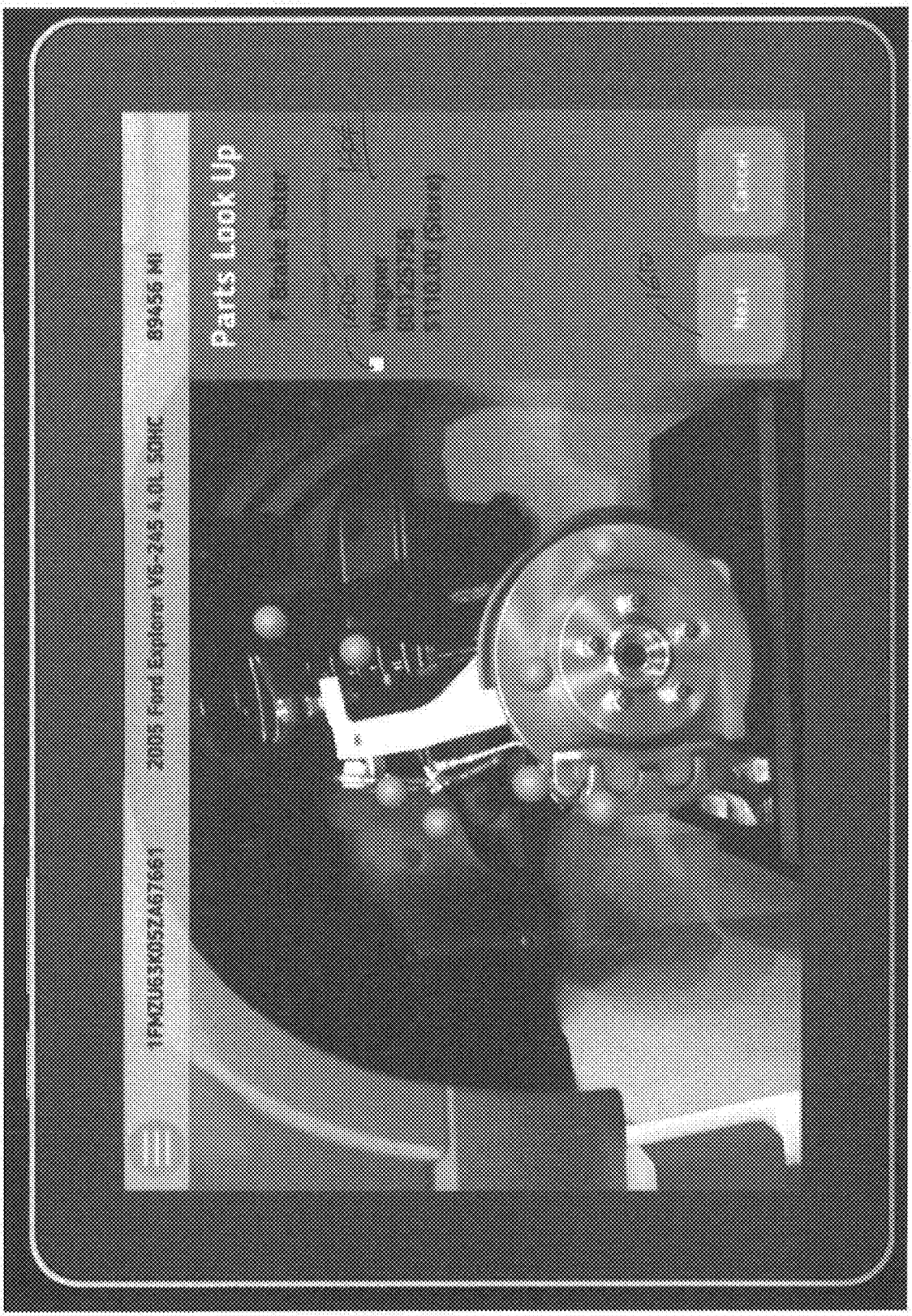
Figure 17:
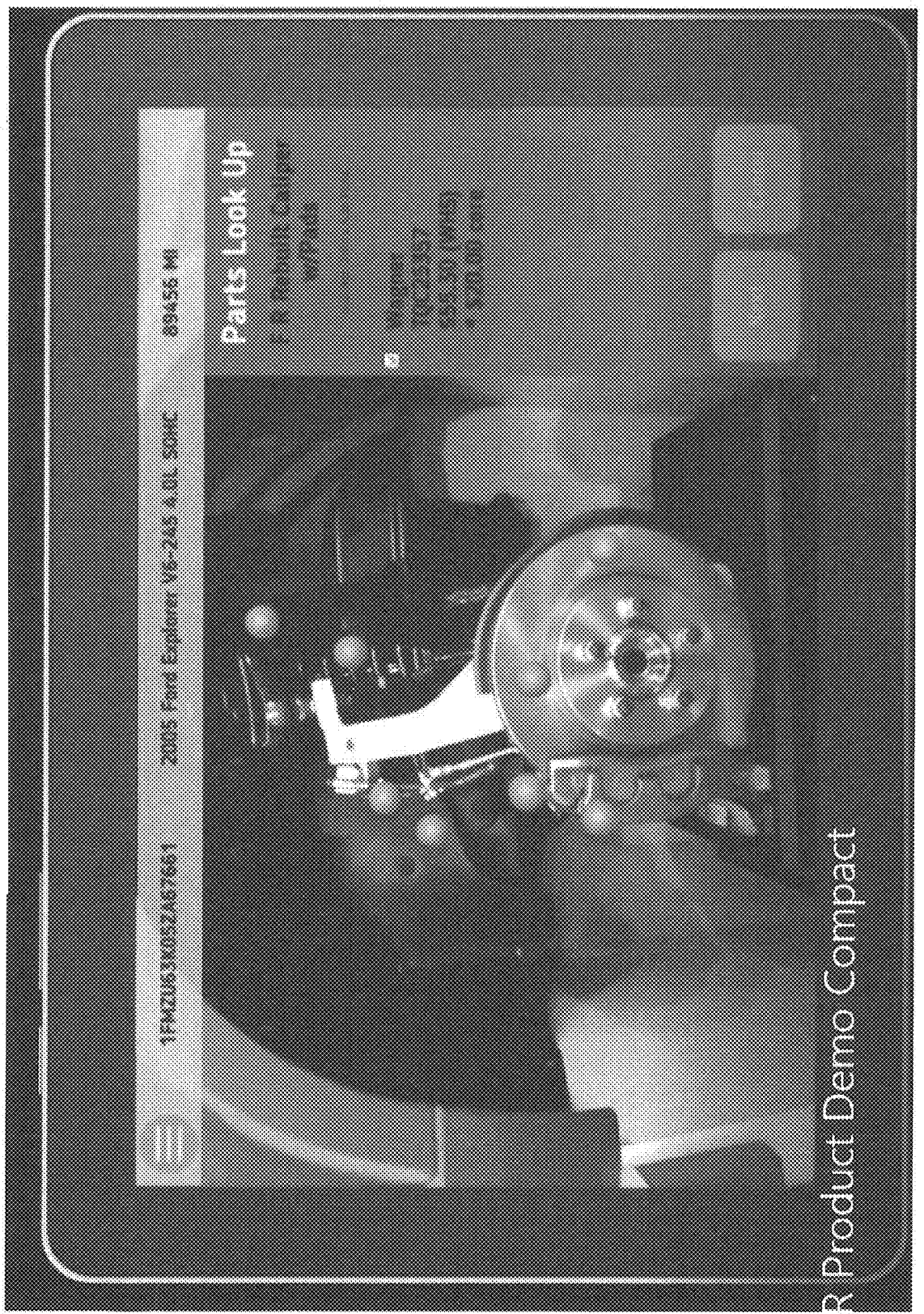

At least one example embodiment also allows the user to look up parts for replacement by selecting the "lookup" button 920 from the services selection screen 904 (step 244) (see FIG. 14). After selection of the "lookup" function, the system 100 operates to identify the imaged vehicle assembly (step 228c). A supplier dialog 1504 is then displayed (step 246), and the user can select a supplier from a list 1508 (step 247) (see FIG. 15). In addition, parts that have been identified as requiring replacement (e.g. associated with a red icon 1008) or recommended for replacement (e.g. associated with an orange icon 1008) are then identified (step 248). The system 100 can access information contained in a parts database 156 regarding components that have been indicated as requiring replacement or for which replacement is suggested or access information about other identified components (step 252). In accordance with at least one example embodiment, the user can the send a request to a selected supplier or set of suppliers for identified part availability and price (step 253). Therefore, the information accessed can include the part number, supplier's price, supplier's availability, and the like. At step 254, information icons 1008 can be displayed, for example as an overlay on the image in the display 108, next to or over the image of the corresponding part. The selection of an icon 1008 associated with a particular component will cause a part information window or overlay 1604 to be presented (step 256). The part information window 1604 can include information identifying the selected component and the manufacturer of that part, the part number, and pricing information (see FIG. 16). In accordance with the least some embodiments, multiple equivalent parts from a selected supplier, or parts from different suppliers, can be listed. By checking the box next to a listed part 1606, the part and information is placed in a cart for later creating estimates and/or parts orders. (step 258). After selecting the next button 1610, the user can select another component for which a parts lookup operation is to be performed, for example as depicted in FIG. 17, which illustrates parts information presented after the selection of an icon 1008 associated with a brake caliper and pad assembly.

Figure 18:
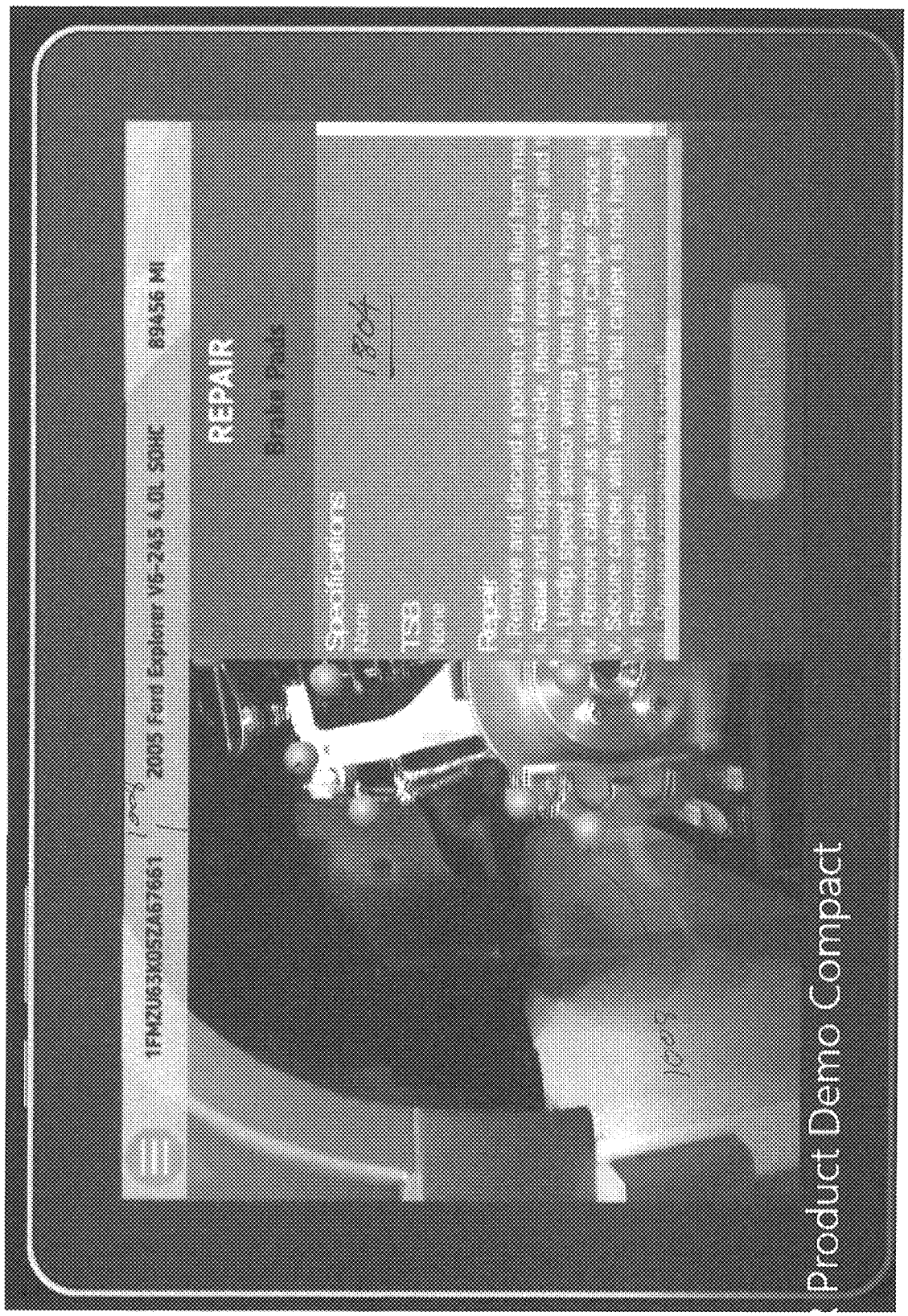
Figure 19:
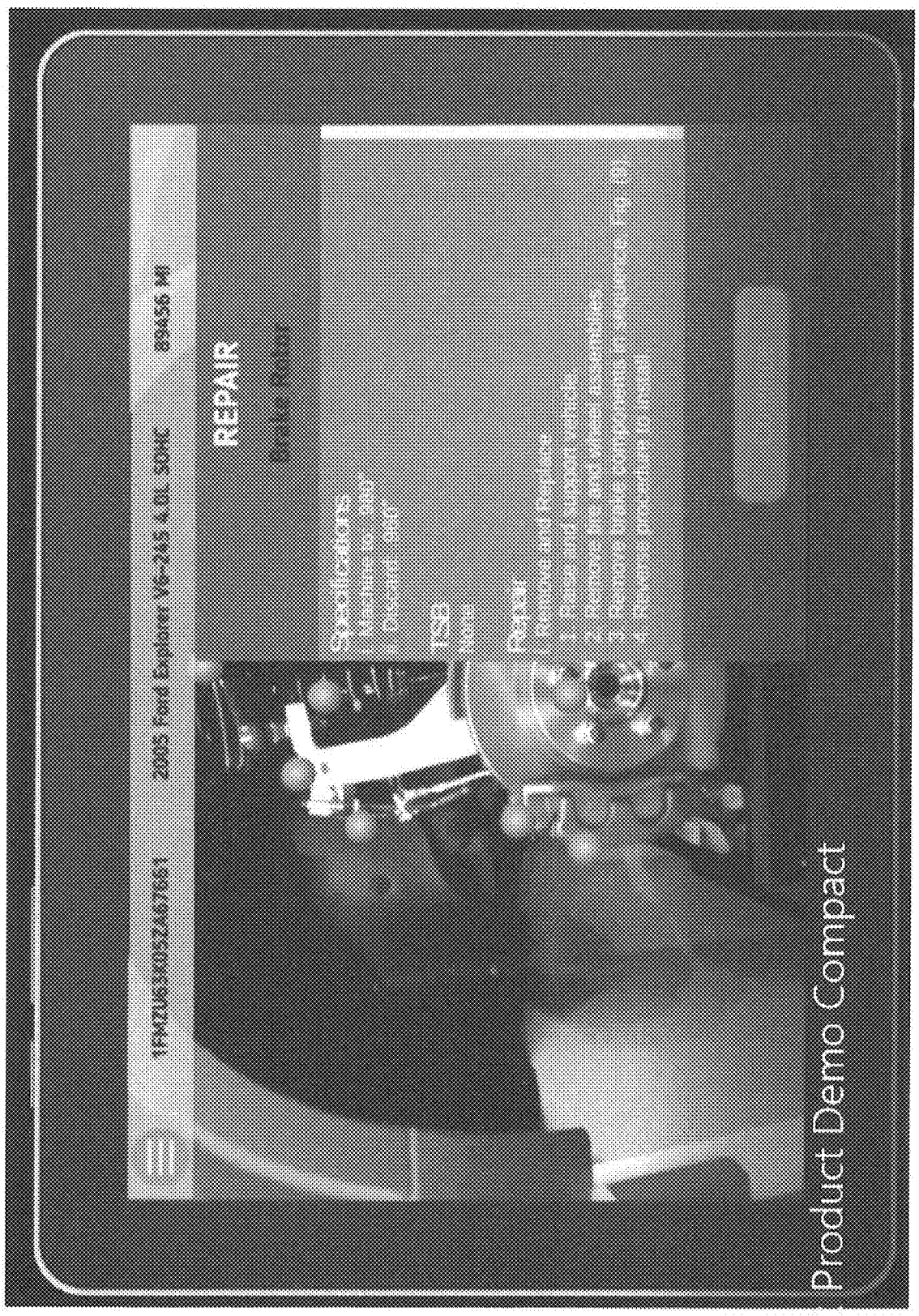

A user can also access repair information (step 264). In response to or concurrently with a selection to access repair information, the system 100 operates to identify the imaged vehicle assembly (step 228d). The system 100 further operates to cross reference and display repair database 156 information icons 1008, which are overlaid on associated components within the image (step 266)(see FIG. 18). The particular assembly or component for which repair information is requested can then be indicated by the user through the selection of the icon 1008 associated with that assembly or component, which in results in the display of repair information for the component 1804 (step 268). Alternatively or in addition, in response to a selection of the "repair" button 924 from the services selection screen 904, the system 100 can access repair information regarding an assembly or component identified during an earlier inspection process as requiring replacement. In accordance with at least one example embodiment the repair information for a selected component is presented in a repair information window or overlay 1804. The repair information can be presented as text, diagrams, videos, or the like. Moreover, information presented by the repair information window 1804 can be accessed through scrolling or clicking on links embedded in the window 1804. Repair information for other parts can be accessed by selecting the icon 1008 associated with another part. For example, while FIG. 18 depicts repair information pertaining to the replacement of brake pads, FIG. 19 depicts repair information for replacing the brake rotor.

At step 272, operation of the system can continue, for example through selections of other operations, or the selection of the home button. Alternatively, operation of the system can be concluded.

Accordingly, at least one example embodiment provides an augmented reality system 100 that facilitates the identification, inspection, repair, and replacement of vehicle 120 assemblies 124 and components (parts) 126. The augmented reality system 100 operates to identify assemblies 124 and/or components 126 within an image obtained by a camera 104, and to generate one or more floating icons 1008 that appear over or next to identified assemblies 124 or components 126 within a display 108 that also presents the image. By changing a field of view 116 of the camera 104, the user can bring different areas of the vehicle 120, and thus different assemblies 124 and components 126 in view. The system 100 further provides a user interface that allows the user to obtain additional information about an identified assembly 124 or component 126 by selecting an icon 1008 associated with the assembly 124 or component 126 using a user input, such as a touch screen display 108. The system 100 can reference one or more databases to provide the additional information. Moreover, the system 100 can interface with third party databases or systems to provide additional information, including but not limited to parts availability and pricing information. The system 100 thus integrates identification, inspection, repair, and replacement operations through a user device 112.

Figure 20:
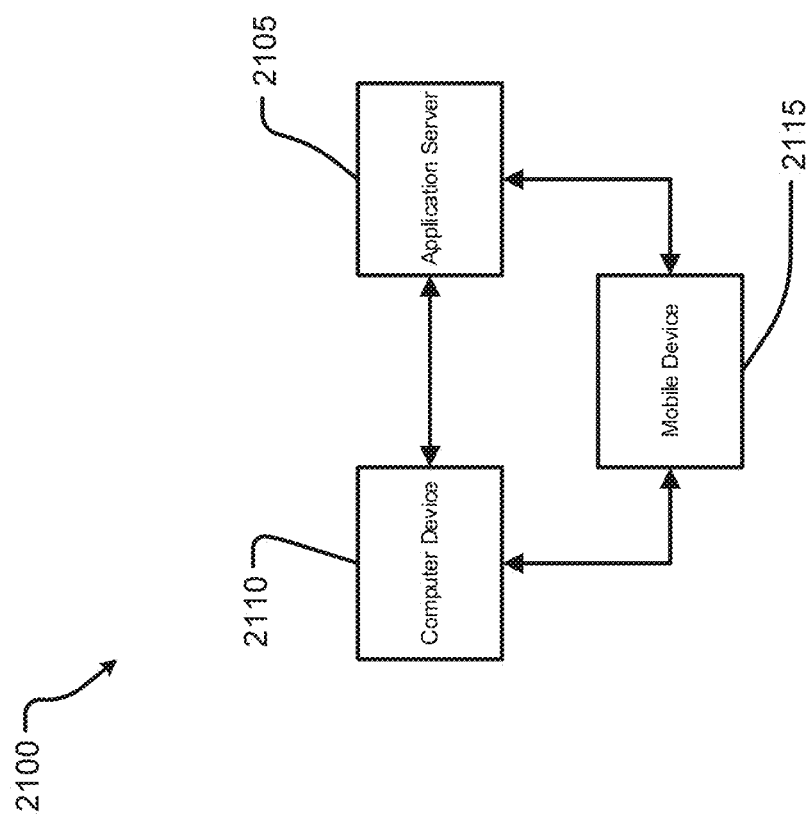
FIG. 20 is a block diagram depicting components of a system in accordance with at least one example embodiment.

FIG. 20 is a block diagram depicting components of a system 2100 in accordance with example embodiments. In more detail, the system 2100 includes an application server (or host device) 2105, a computer device (or client device, or device) 2110, and a mobile device (or client device, or device) 2115. The application server 2105 may be any type of computing device with storage and processing capabilities for remotely or locally managing and/or running an application (i.e., a software application), such as the application 152. The computer device 2110 and the mobile device 2115 be any type of computing devices with storage and processing capabilities. For example, the application server 2105, the computer device 2110, and/or the mobile device 2115 each include a memory including instructions and a processor or microprocessor for executing the instructions to carry out operations (e.g., the operations in FIG. 21). Alternatively or additionally, the application server 2105, the computer device 2110, and/or the mobile device 2115 may each include one or more logic circuits performing logic operations, an integrated circuit (e.g., an application specific IC (ASIC), etc.). Alternatively or additionally, the application server 2105, the computer device 2110, and/or the mobile device 2115 may each include an associated display for displaying images related to the application and other images. The application server 2105, the computer device 2110, and/or the mobile device 2115 may have the same or similar structure as the server 128. In one embodiment, the mobile device 2115 has a same structure as user device 112.

According to at least one example embodiment, the computer device 2110 is a desktop computer or other usually stationary computing device having the application stored and executable thereon. However, example embodiments are not limited thereto, and the computer device 2110 may be mobile. According to at least one example embodiment, the mobile device 2115 is a smartphone, tablet, and/or other normally mobile device. The computer device 2110 and the mobile device 2115 may be in communication with one another and the application server 2105 over any type of wired and/or wireless network (e.g., fiber cable network, Wi-Fi, etc.). The application server 2105 may be at a remote server or a local server for the computer device 2110 and/or the mobile device 2115.

Figure 21:
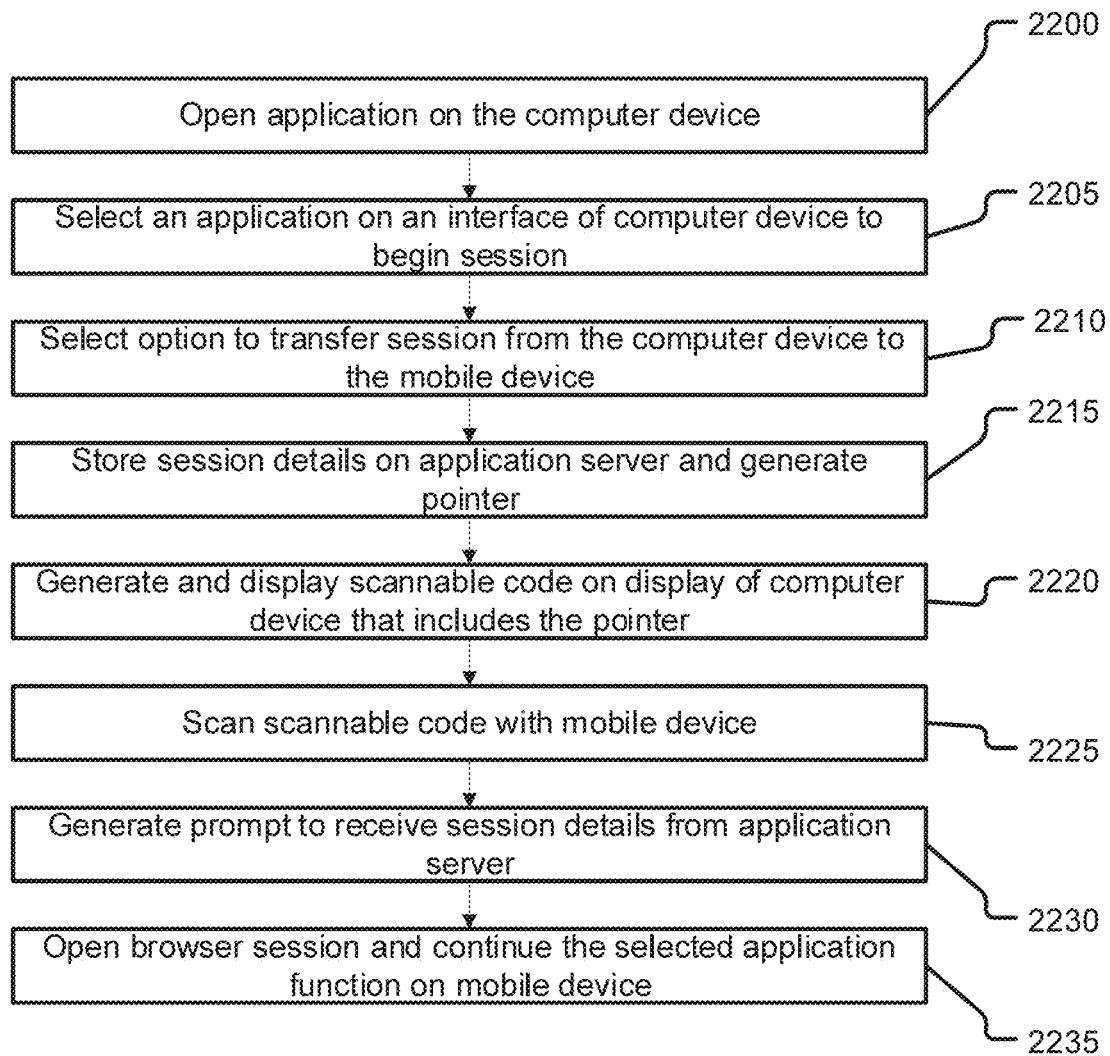
FIG. 21 is an example method in accordance with at least one example embodiment.

FIG. 21 illustrates an example method in accordance with at least one example embodiment. The operations in FIG. 21 may be performed by one or more devices/servers in the system 2100.

In operation 2200, the method includes opening an application on the computer device 2110. The application may include a software application or program stored on a memory of the computer device 2110, and may open upon user input from a mouse or keyboard of the computer device 2110. In at least one example embodiment, the application is an application for performing vehicle services, such as the augmented reality application 152 described with reference to FIGS. 1-19. However, example embodiments are not limited thereto and the application may be any application desired for transferring from the computer device 2110 to the mobile device 2115. It should be understood that operation 2200 may include one or more authentication operations (e.g., username and password verification) that authenticate a user of the computer device 2110 to the application server 2105.

In operation 2205, the method includes selecting an application on an interface of the computer device 2110 to begin a session (e.g., an authenticated session) between the computer device 2110 and the application server 2105. Selecting the application may include a user selecting, via a mouse and/or a keyboard, an icon of the application on a display of the computer device 2110 to enter a subset of operations made available by the application. In the event that the application is for performing vehicle services, the application may be for performing a vehicle inspection. The session may be established using a session key for encrypting/decrypting communication (including communication of the session details) between the application server 2105 and the computer device 2110/mobile device 2115. For example, the session key may be a secure hash algorithm 256 bit key (SHA-256). The session key may be unique to that particular session between the application server 2105 and the computer device 2110.

In operation 2210, the method includes selecting an option to transfer the session from the computer device 2110 to the mobile device 2115. The selection may be made by a user of the computer device 2110 within the application.

In operation 2215, the method stores details of the session (or state information or the application) created in operation 2205 and generates a pointer associated with the session. For example, the details of the session are stored in the application server 2105 or some other device in communication with the application server 2105 (e.g., the computer device 2110). Details of the session may include information already entered into the application open on the computer device 2110, an interface of the application currently displayed on the computer device 2110, etc. The computer device 2110 may send the session details to the application server 2105 upon receiving the selection to transfer the session from the computer device 2110 to the mobile device 2115. Additionally or alternatively, the computer device 2110 may automatically send the session details to the application server 2105 periodically (e.g., every few seconds or other desired time period) to enable "live tracking" of the application on the computer device 2110 by the application server 2105.

The generated pointer may be any pointer for linking the session to the session details stored by the application server 2105. For example, the pointer may be unique to that particular session between the application server 2105 and the computer device 2110. Operation 2215 may occur in response to the selection of the option to transfer the session made in operation 2210.

In operation 2220, the method includes generating and displaying (e.g., by the computer device 2110) a scannable code on a display of the computer device 2110. The scannable code may be a one-dimensional code (e.g., barcode), a two-dimensional code (e.g., QR code), etc. The scannable code may include a pattern (e.g., unique pattern) that represents the session established in operation 2205. For example, the scannable code includes encoded data (e.g., UTF-8 encoded data), such as the pointer. The pointer may be an encoded uniform resource locator (URL) or other pointer to a web address associated with the session. The scannable code may be generated by the computer device 2110 and/or the application server 2105 according to known techniques.

In operation 2225, the method includes scanning the scannable code with the mobile device 2115. For example, the mobile device 2115 may include a camera for capturing the scannable code and a code reading application stored that interprets the scannable code once captured.

In operation 2230, the method includes generating a prompt to receive the session details stored in operation 2215. For example, the mobile device 2115 may generate a visual and/or audio prompt that inquires as to whether a user of the mobile device 2115 would like to open a web-browser that directs the user to the URL encoded into the scannable code. The prompt may include a selectable text field that enables the user to select whether or not to proceed with opening the URL. A format of the URL may be as follows: https://<BASEURL>/session?auth=<ENCODEDKEY>.

Operation 2230 may also include an authentication step where the user of the mobile device 2115 authenticates with the application server 2105 in the same manner as described above with respect to authenticating the computer device 2110 to the application server 2105 (e.g., with a username and password). This is to ensure that the user of the mobile device 2115 is authorized to proceed with transferring the session from the computer device 2110 to the mobile device 2115. Here, it should be understood that operation 2230 may be omitted if desired so that that method proceeds from operation 2225 directly to operation 2235. In this case, the scanning in operation 2225 will automatically trigger operation 2235.

In operation 2235, when the mobile device 2115 opens the URL (in response to the user's selection of the prompt in operation 2230 or in response to operation 2225 if operation 2230 is omitted), the mobile device 2115 retrieves the session details stored in operation 2215 and begins a web-browser session to continue using the selected application from operation 2205 on the mobile device 2115. For example, the mobile device 2115 retrieves the session details from the application server 2105. In other words, the session between the computer device 2110 and the application server 2105 is transferred so that the session is now between the mobile device 2115 and the application server 2105. The retrieved session details allow the application to pick up on the mobile device 2115 where it left off on the computer device 2110 so that any information entered into the application at the computer device 2110 and/or any navigation performed in the application on the computer device 2110 is seamlessly transferred to the mobile device 2115.

Following the session transfer, the mobile device 2115 may continuously communicate with the application server 2105 to operate functions of the application. In the event that it is desired to transfer the session between the mobile device 2115 back to the computer device 2110 or to another device, then the method of FIG. 21 is carried out again except that the method treats the mobile device 2115 as the computer device 2110 and the computer device 2110 (or other device) as the mobile device 2115. Additionally or alternatively, it should be understood that the functionality of the application on the computer device 2110 may terminate or remain intact after the session transfer to the mobile device 2115. That is, according to at least one example embodiment, it is possible to operate terminate the session between the computer device 2110 and the application server 2105 or to operate two sessions in parallel with one another, one session between the computer device 2110 and the application server 2105 and another version of the same session between the mobile device 2115 and the application server 2105. In this case, both the computer device 2110 and the mobile device 2115 may communicate with the application server 2105 to ensure all information input into the application at either device 2110/2115 is up to date on both devices 2110/2115.

In at least one example embodiment, the system prevents further input to the application at the computer device 2110 after the session is transferred to the mobile device 2115 (e.g., by closing the application on the computer device 2110, displaying an overlay that does not allow user interaction with the application at the computer device 2110, etc.).

However, in at least one other example embodiment, the system enables both the computer device 2110 and the mobile device 2115 to continue operating the application in parallel. For example, subsequent to transferring the session from the computer device 2110 to the mobile device 2115, the computer device 2110 runs a separate instance of the application than the one transferred to the mobile device 2115 and continues to allow user input to the application at the computer device 2110. In this case, the application server 2105 may track first updates made to the application at the computer device 2110 subsequent to transfer of the session, and send the first updates to the mobile device 2115. The application server 2105 may track second updates made to the application at the mobile device 2115 subsequent to transfer of the session, and send the second updates to the computer device 2110. This may enable a user at the computer device 2110 to navigate/operate within the application along with another user of the mobile device 2115. Both devices 2110 and 2115 may continuously update (e.g., periodically update) the application server 2105 with inputs at the application so that that updates to the instance of the application made at the computer device 2110 are also made to the instance of the application running on the mobile device 2115 and vice versa.

When running the application in parallel on the computer device 2110 and the mobile device 2115, user input abilities for the application running at the computer device 2110 and/or the mobile device 2115 may be restricted so as to reduce the possibility of interfering user inputs. For example, in a vehicle repair environment, user input at the computer device 2110 may be restricted to functions within the application that usually occur or are anticipated to occur at the computer device 2110 (e.g., editing general vehicle information within the application such as VIN number, owner information, etc.) while user input at the mobile device 2115 may be restricted to functions within the application that usually occur or are anticipated to occur at the mobile device 2115 (e.g., editing fields related to part wear, part information, repair recommendations, etc.). The restrictions may be preset or variable and based on empirical evidence and/or preference. If user inputs do interfere, for example, if the user of the mobile device 2115 is attempting to edit a field in the application that is currently being edited by the computer device 2110, a warning message may be displayed on the interfering device and the user of the interfering device may be prevented from making edits.

FIGS. 22A-22F illustrate a series of screen shots for an implementation of one or more of the operations in FIG. 21. In more detail, FIGS. 22A-22F illustrates an example implementation where the application is for managing automotive services including inspections of vehicles.

Figures 22A, 22B:
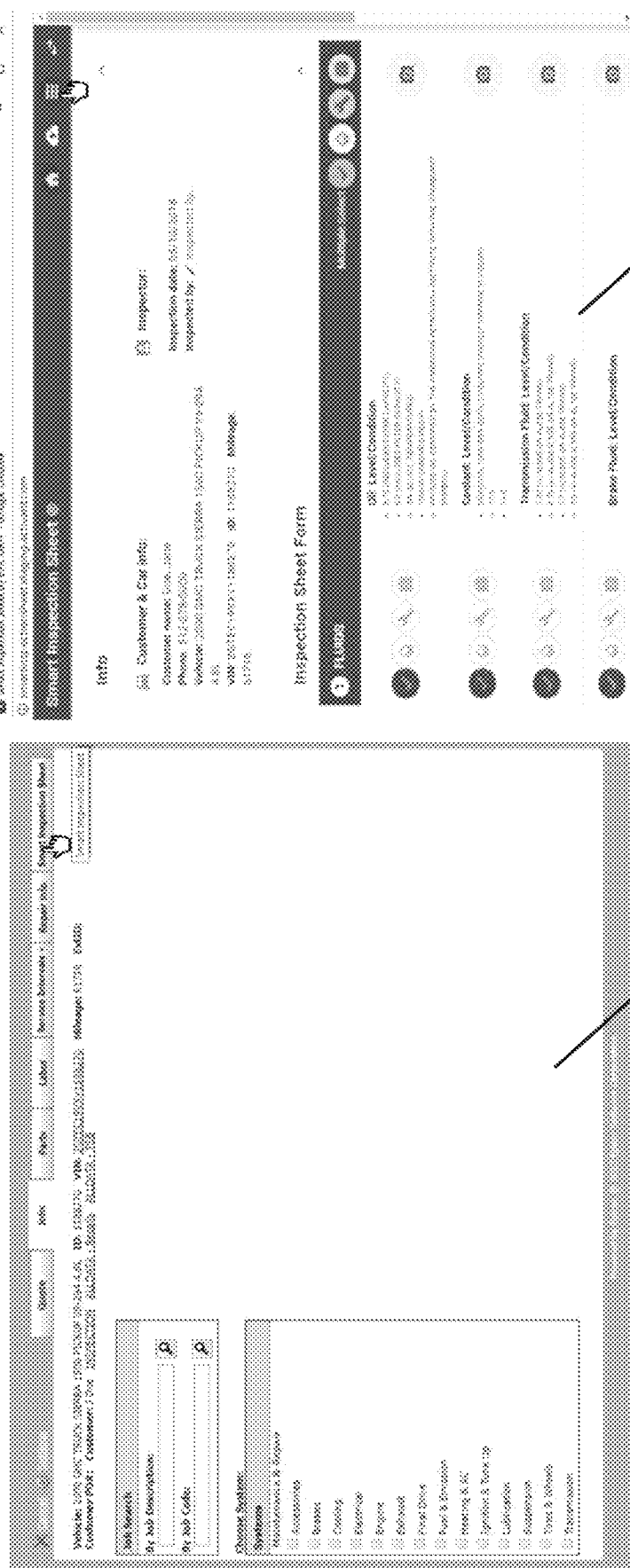
FIGS. 22A-22F illustrates a series of screen shots on elements of the system in FIG. 20 carrying out operations in FIG. 21 in accordance with at least one example embodiment.

FIG. 22A illustrates an example screen shot that may correspond to operation 2200 which includes opening an application on the computer device 2110. As shown, the initial instance of the application includes a plurality of text fields and tabs related to performing one or more services on a vehicle.

FIG. 22B illustrates an example screen shot that may correspond to operation 2205 which includes selecting an application from a tab on the interface in FIG. 22A.

Figure 22D:
Figure 22C:
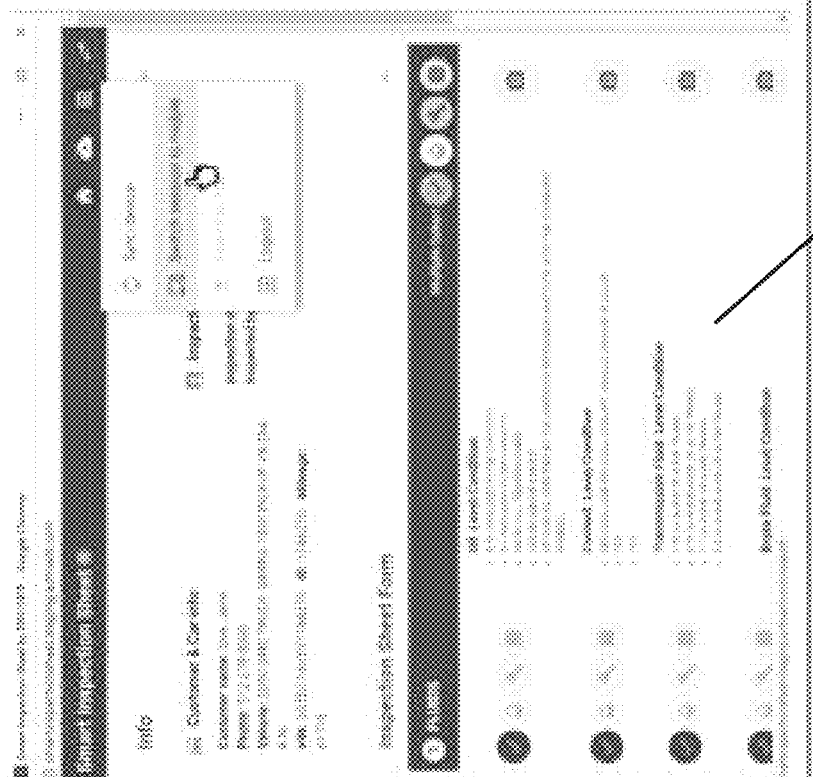

FIG. 22C illustrates an example screen shot that may correspond to operation 2210 which includes selecting an option on the interface in FIG. 22B to transfer sessions. In FIG. 22C, the selection is implemented using a pull down menu from an icon on the interface, and selecting "switch session to mobile."

FIG. 22D illustrates an example screenshot that may correspond to operation 2220 which includes generating and displaying a scannable code on the display of the computer device 2110. FIG. 22D illustrates an example two-dimensional scannable code.

Figure 22F:
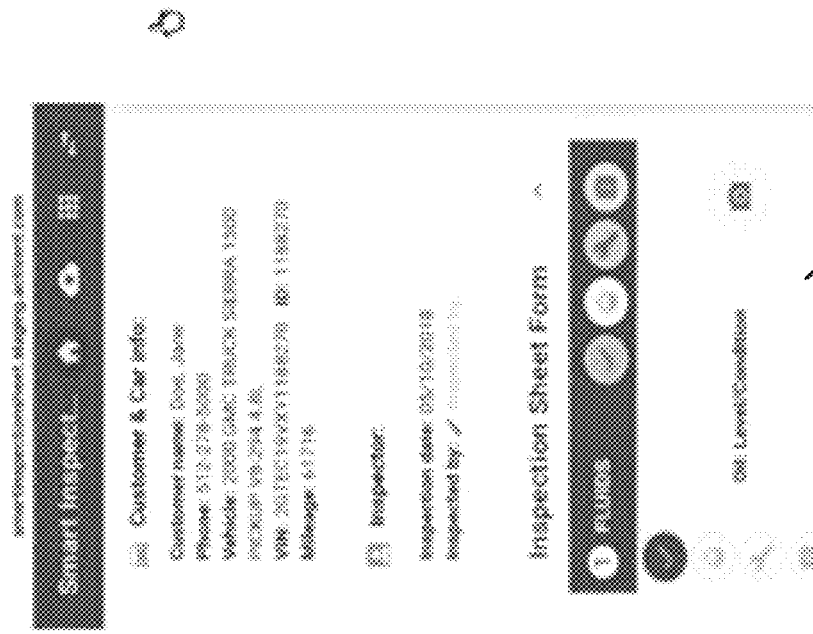
Figure 22E:
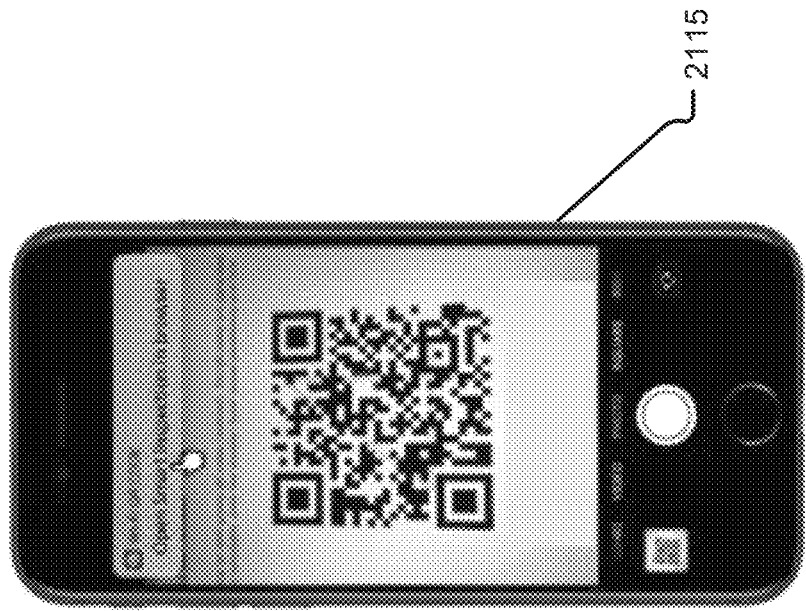

FIG. 22E illustrates an example screenshot that may correspond to operations 2225/2230, which include the mobile device 2115 scanning the scannable code on the display of the computer device 2110, and generating a prompt that allows the user of the mobile device to initiate transfer of the session or not (e.g., a selectable field, illustrated in FIG. 22E as "Open Smart Inspection in browser").

FIG. 22F shows an example screenshot may correspond to operation 2230, which includes transferring the session from the computer device 2110 to the mobile device 2115. As shown, the instance of the application in FIG. 22F matches the instant of the application in FIG. 22B so that a user of the mobile device 2115 picks up on the application where the computer device 2110 was prior to transferring the session. Accordingly, the user of the mobile device 2115 may seamlessly continue with extracting and/or inputting information into the application.

In view of above, it should be understood that example embodiments are directed to a method that includes establishing, by a first client device 2110, a first session with a host device 2105 to run an application of the host device 2105 on the first client device 2110. The method includes receiving an indication to transfer the first session to a second client device 2115. The method includes storing, in response to receiving the indication, state information (or session details) of the application for the first session. The method includes generating a pointer for the first session, and generating a scannable code such that the pointer is encoded into the scannable code. The method includes displaying the scannable code on a first display associated with the first client device 2110, and scanning the displayed scannable code using an imaging element (e.g., a camera) associated with the second client device 2115. The method includes transferring the first session from the first client device 2110 to the second client device 2115 using the stored state information so that a second display associated with the second client 2115 device displays a most recently updated instance of the application from the first client device 2110.

According to at least one example embodiment, the method includes generating a prompt at the second client device 2115 subsequent to the scanning and prior to the transferring. The prompt allows a user of the second client device 2115 to initiate the transferring or not. The storing includes storing the state information at the host device 2105. According at least one example embodiment, the scannable code is a one-dimensional code or a two-dimensional code. The method may further include generating a web browser link unique to the first session based on the pointer and in response to the scanning. The transferring may include opening the web browser link in a web browser of the second client device 2115 such that the second display displays the most recently updated instance of the application. According to at least one example embodiment, the state information includes information input to the application on the first client device prior to the transferring. For example, the state information may include any information entered into editable fields of the application, one or more states of a graphical user interface of the application, etc. The method may further include terminating the first session between the host device 2105 and the first client device 2110 subsequent to the transferring. Alternatively, the method may include continuing the first session between the host device 2105 and the first client device 2110 subsequent to the transferring so that the first session runs in parallel on the first client device 2110 and the second client device 2115. The method may further include authenticating the second client device 2115 to the host device 2105 prior to the transferring.

In view of the above, it should be appreciated that example embodiments provide the ability to seamlessly transfer a session of an application from a first client device to a second client device without the need to re-input information and/or re-navigate to application pages subsequent to the transfer, which increases efficiency of the system by virtue of reducing traffic between client devices and a host device. In addition, example embodiments provide a convenient way to shift sessions back and forth between stationary devices and mobile devices if desired. Further still, transferring sessions according example embodiments allows a user of a client device to have the full functionality of an application without having the full application downloaded on the that particular client device.

At least one example embodiment is directed to a method including establishing a session between a first client device and a host device to run an application on the first client device. The method includes receiving an indication to transfer the session from the first client device to a second client device. The method includes storing, in response to receiving the indication, state information of the application for the session. The method includes generating a pointer associated with the session. The method includes generating a scannable code including the pointer, and displaying the scannable code on a first display associated with the first client device. The method includes scanning the displayed scannable code using an imaging element associated with the second client device. The method includes transferring, using the pointer, the session from the first client device to the second client device using the stored state information so that a second display associated with the second client device displays a most recently updated instance of the application from the first client device.

According to at least one example embodiment, the method includes generating a prompt at the second client device subsequent to the scanning and prior to the transferring, the prompt requesting a user of the second client device to initiate the transferring.

According to at least one example embodiment, the storing includes storing the state information at the host device.

According to at least one example embodiment, the pointer is encoded into the scannable code.

According to at least one example embodiment, the pointer includes a web browser link, and the transferring includes opening the web browser link in a web browser of the second client device such that the second display displays the most recently updated instance of the application.

According to at least one example embodiment, the state information includes information input to the application on the first client device prior to the transferring.

According to at least one example embodiment, the method includes terminating the session between the host device and the first client device subsequent to the transferring.

According to at least one example embodiment, the method includes continuing the session between the host device and the first client device subsequent to the transferring so that the application runs in parallel on the first client device and the second client device.

According to at least one example embodiment, the method includes authenticating the second client device to the host device prior to the transferring.

According to at least one example embodiment, the method includes receiving an image of a vehicle assembly, identifying the vehicle assembly from the image of the vehicle assembly, augmenting the image with an indicator associated with a component of the identified vehicle assembly, receiving a user selection of the indicator associated with a component part of the identified vehicle assembly, providing information regarding the component part associated with the selected indicator.

According to at least one example embodiment, the information regarding the component part is at least one of inspection information, repair information, or replacement part information.

At least one example embodiment is directed to a system including a host device, a first device, and a second device. The host device receives an indication from the first device to transfer a session of an application running on the first device to the second device. The host device, in response to receiving the indication, stores state information associated with the session. The host device generates a pointer for the session and sends the pointer to the first device. The first device displays a scannable code on a first display, the pointer being encoded into the scannable code. The second device scans the displayed scannable code. The host device, in response to receiving an indication that the second device has scanned the scannable code, transfers the session from the first device to the second device using the pointer and the stored state information. In response to the host device transferring the session, the second device displays a most recently updated instance of the application from the first device on a second display.

According to at least one example embodiment, the second device generates a prompt requesting a user of the second device to send the indication.

According to at least one example embodiment, the pointer is a web browser link unique to the session, and the host device, in response to receiving the indication, sends the web browser link to the second device. The second device opens the web browser link in a web browser such that the second display displays the most recently updated instance of the application.

According to at least one example embodiment, the state information includes information input to the application on the first device prior to the session being transferred.

According to at least one example embodiment, the host device continues the session between the host device and the first device subsequent to transferring the session to the second device so that the session runs in parallel on the first device and the second device.

At least one example embodiment is directed to a server including a processor, a memory including instructions that when executed by the processor, cause the processor to establish a session with a first client device to run an application on the first client device. The instructions cause the processor to store, in response to a request to transfer the session from the first client device to a second client device, state information of the application for the session. The instructions cause the processor to generate a pointer for the session, send the pointer to the first client device, and transfer, in response to receiving an indication that the second client device has scanned a scannable code encoded with the pointer, the session from the first client device to the second client device using the pointer and the stored state information.

According to at least one example embodiment, the instructions cause the processor to track first updates made to the application at the first client device subsequent to transfer of the session, and send the first updates to the second client device.

According to at least one example embodiment, the instructions cause the processor to track second updates made to the application at the second client device subsequent to transfer of the session, and send the second updates to the first client device.

According to at least one example embodiment, the pointer is a web browser link, and the instructions cause the processor to transfer the session by sending the web browser link to the second client device, the web browser link enabling the second client device to continue the session.

Example embodiments have been described with some degree of particularity directed to the exemplary embodiments of the inventive concepts. It should be appreciated though that modifications or changes may be made to the exemplary embodiments without departing from the inventive concepts contained herein. For example, one or more example embodiments may be combined if desired.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The terms "determine", "calculate" and "compute," and variations thereof, as used herein, are used interchangeably and include any type of methodology, process, mathematical operation or technique.

As will be appreciated, other aspects, embodiments, and/or configurations of the disclosure are possible utilizing, alone or in combination, one or more of the features set forth above or described in detail below. Also, while the disclosure is presented in terms of example embodiments, it should be appreciated that individual aspects of the disclosure can be separately claimed.

The foregoing description has been presented for purposes of illustration and description. Further, the description is not intended to limit the disclosed systems and methods to the forms disclosed herein. Consequently, variations and modifications commensurate with the above teachings, within the skill or knowledge of the relevant art, are within the scope of inventive concepts. The example embodiments described hereinabove are further intended to explain the best mode presently known of practicing the disclosed systems and methods, and to enable others skilled in the art to utilize the disclosed systems and methods in such or in other embodiments and with various modifications required by the particular application or use. It is intended that the appended claims be construed to include alternative embodiments to the extent permitted by the prior art.

It is claimed:
1. A method, comprising:
  establishing a session between a first client device and a host device to run an application on the first client device;
  capturing, by the first client device during the session, a live view of a vehicle assembly;
  identifying the vehicle assembly from an image from the live view of the vehicle assembly;
  providing, by the first client device, while displaying the live view of the identified vehicle assembly on a display of the first client device, a user of the first client device with a menu on the display including options to inspect, repair, and lookup components of the identified vehicle assembly;

receiving, by the first client device, a first user selection that selects an option from the options;
rendering, to the display and in response to the first user selection, the live view of the identified vehicle assembly augmented with floating icons positioned over or near the components of the identified vehicle assembly, wherein each floating icon is associated with one of the components of the identified vehicle assembly, wherein the floating icons maintain their positions over or near the components of the identified vehicle assembly on the display as the live view changes with movement of the first client device, and wherein the live view on the display is augmented with a new floating icon over or near an additional component of the identified vehicle assembly that becomes visible on the display due to the movement of the first client device;
receiving, by the first client device, a second user selection that selects a floating icon associated with a component of the identified vehicle assembly;
providing, by the first client device on the display and in response to the second user selection, information regarding the component that is relevant to the selected option, wherein the information regarding the component includes inspection information for inspecting the component when the selected option is to inspect the component, and wherein, in response to the second user selection and when the selected option is to inspect the component, the first client device:
  renders, to the display, the floating icons with a same first color;
  renders, to the display, a set of inspection results buttons for the component that enable user input to indicate whether the component has not been inspected and whether replacement of the component is suggested, not needed, or needed;
  renders, to the display and in response to a third user selection that selects one of the inspection results buttons for the component, the floating icon of the component with a second color different from the first color, the second color being dependent on the selected inspection result button; and
  stores an indication of the selected inspection result button in a memory of the host device;
receiving an indication to transfer the session from the first client device to a second client device;
storing, in response to receiving the indication to transfer the session, state information of the application for the session;
generating a pointer associated with the session;
generating a scannable code including the pointer;
displaying the scannable code on a first display associated with the first client device;
scanning the displayed scannable code using an imaging element associated with the second client device; and
transferring, using the pointer, the session from the first client device to the second client device using the stored state information so that a second display associated with the second client device displays a most recently updated instance of the application from the first client device.

2. The method of claim 1, further comprising:
generating a prompt at the second client device subsequent to the scanning and prior to the transferring, the prompt requesting a user of the second client device to initiate the transferring, and wherein the floating icons are spheres.

3. The method of claim 1, wherein the storing includes storing the state information at the host device.

4. The method of claim 1, wherein the pointer is encoded into the scannable code.

5. The method of claim 4, wherein the pointer includes a web browser link, and wherein the transferring includes opening the web browser link in a web browser of the second client device such that the second display displays the most recently updated instance of the application.

6. The method of claim 1, wherein the state information includes information input to the application on the first client device prior to the transferring.

7. The method of claim 1, further comprising:
terminating the session between the host device and the first client device subsequent to the transferring.

8. The method of claim 1, further comprising:
continuing the session between the host device and the first client device subsequent to the transferring so that the application runs in parallel on the first client device and the second client device.

9. The method of claim 1, further comprising:
authenticating the second client device to the host device prior to the transferring.

10. The method of claim 1, wherein the information for the component further includes repair information for repairing the component or replacement part information for replacing the component.

11. The method of claim 10, wherein the inspection information includes information regarding acceptable wear conditions of the component, wherein the repair information includes instructions for repairing the component, and wherein the replacement part information identifies a suitable replacement component for the component.

12. A system, comprising:
a host device; and
a first device communicatively coupled to the host device, wherein the first device captures a live view of a vehicle assembly during a session established between the host device and the first device,
wherein the host device identifies the vehicle assembly from an image of the live view of the vehicle assembly, and
wherein the first device:
  provides, while displaying the live view of the identified vehicle assembly on a display of the first device, a user with a menu on the display including options to inspect, repair, and lookup components of the identified vehicle assembly;
  receives a first user selection that selects an option from the options;
  renders, to the display and in response to the first user selection, the live view of the identified vehicle assembly augmented with floating icons positioned over or near the components of the identified vehicle assembly, wherein each floating icon is associated with one of the components of the identified vehicle assembly, wherein the floating icons maintain their positions over or near the components of the identified vehicle assembly on the display as the live view changes with movement of the first device, and wherein the live view on the display is augmented with a new floating icon over or near an additional component of the identified vehicle assembly that becomes visible on the display due to the movement of the first device;

receives a second user selection that selects a floating icon associated with a component of the identified vehicle assembly; and provides, on the display and in response to the second user selection, information regarding the component that is relevant to the selected option, wherein the information regarding the component includes inspection information for inspecting the component when the selected option is to inspect the component, and wherein, in response to the second user selection and when the selected option is to inspect the component, the first device:

renders, to the display, the floating icons with a same first color;

renders, to the display, a set of inspection results buttons for the component that enable user input to indicate whether the component has not been inspected and whether replacement of the component is suggested, not needed, or needed;

renders, to the display and in response to a third user selection that selects one of the inspection results buttons for the component, the floating icon associated with the component with a second color different from the first color, the second color being dependent on the selected inspection result button; and stores an indication of the selected inspection result button in a memory of the host device.

13. The system of claim 12, wherein the inspection information includes acceptable wear conditions of the component.

14. The system of claim 13, wherein, subsequent to the inspection of the component, the first device:

receives a fourth user selection to lookup one or more components of the identified vehicle assembly;

retrieves, in response to the fourth user selection, the indication of the selected inspection result button from the memory of the host device;

determines that replacement of the component is suggested or needed based on the indication retrieved from the memory of the host device;

renders, to the display and in response to determining that replacement of the component is suggested or needed, a list of suppliers for supplying a replacement component for the component;

receives a fifth user selection that selects a supplier from the list of suppliers; and stores, in response to the fifth user selection, the replacement component from the selected supplier in a digital cart.

15. The system of claim 12, wherein the information regarding the component includes repair instructions for repairing the component when the selected option is to repair the component, wherein, subsequent to the inspection of the component, the first device:

receives a fourth user selection to repair one or more components of the identified vehicle assembly;

retrieves, in response to the fourth user selection, the indication of the selected inspection result button from the memory of the host device;

determines that repair of the component is suggested or needed based on the indication retrieved from the memory of the host device; and renders, on the display and in response to determining that repair of the component is suggested or needed, the repair instructions for repairing for the component.

16. The system of claim 12, wherein the information regarding the component includes replacement part information for replacing the component when the selected option is to lookup the component.

17. A system, comprising:

at least one processor; and at least one memory including instructions that when executed by the at least one processor, cause the at least one processor to:

capture, during a session of an application, live view of a vehicle assembly;

identify the vehicle assembly based on an image from the live view of the vehicle assembly;

provide, while displaying the live view of the identified vehicle assembly on a display of a first device, a user of with a menu including options to inspect, repair, and lookup components of the identified vehicle assembly;

receive a first user selection that selects an option from the options;

link information relevant to the selected option to floating icons, wherein the information linked to the floating icons is different for each option of the menu, and wherein each floating icon is associated with one of the components of the identified vehicle assembly;

render, to the display and in response to the first user selection, the live view of the identified vehicle assembly augmented with the floating icons positioned over or near the components of the identified vehicle assembly, wherein the floating icons maintain their positions over or near the components of the identified vehicle assembly on the display as the live view changes with movement of the first device, and wherein the live view on the display is augmented with a new floating icon over or near an additional component of the identified vehicle assembly that becomes visible on the display due to the movement of the first device;

receive a second user selection that selects a floating icon associated with a component of the identified vehicle assembly; and render, to the display and in response to the second user selection, the information that is linked to the floating icon, wherein the information includes inspection information for inspecting the component when the selected option is to inspect the component, and wherein, in response to the second user selection and when the selected option is to inspect the component, the at least one processor:

renders, to the display, the floating icons with a same first color;

renders, to the display, a set of inspection results buttons for the component that enable user input to indicate whether the component has not been inspected and whether replacement of the component is suggested, not needed, or needed;

renders, to the display and in response to a third user selection that selects one of the inspection results buttons for the component, the floating icon associated with the component with a second color different from the first color, the second color being dependent on the selected inspection result button; and stores an indication of the selected inspection result button in a memory of a host device communicatively coupled to the first device.

18. The system of claim 17, wherein the inspection information includes acceptable wear conditions of the component.

19. The system of claim 17, wherein the information regarding the component includes repair instructions for repairing the component when the selected option is to repair the component.

20. The system of claim 17, wherein the information regarding the component includes replacement part information for replacing the component when the selected option is to lookup the component.

* * * * *